United States Patent [19]

Kageyama et al.

[11] Patent Number: 5,265,209
[45] Date of Patent: Nov. 23, 1993

[54] PRINT CONTROL APPARATUS FOR PRINTING PAGES HAVING DIFFERENT PAGE SIZES USING ONE OR MORE OF A PLURALITY OF SAME-SIZED PAGE BUFFERS

[75] Inventors: Seiji Kageyama, Fuchu; Keiichi Nakane, Yokohama; Chikahiko Nagata, Hadano, all of Japan

[73] Assignee: Hitachi, Ltd., Tokyo, Japan

[21] Appl. No.: 3,943

[22] Filed: Jan. 19, 1993

Related U.S. Application Data

[63] Continuation of Ser. No. 605,280, Oct. 30, 1980, abandoned.

[30] Foreign Application Priority Data

Oct. 30, 1989 [JP] Japan ................... 1-282747

[51] Int. Cl.⁵ .............................................. G06F 3/12
[52] U.S. Cl. ..................................... 395/102; 395/116; 355/311
[58] Field of Search ............... 355/319, 24, 77, 311, 355/313; 364/DIG. 1, DIG. 2; 395/102, 107, 115, 116, 139, 148

[56] References Cited

U.S. PATENT DOCUMENTS 4,425,629 1/1984 Cason et al. .................. 395/148
4,977,519 12/1990 Chang et al. .................. 395/102
4,996,650 2/1991 Kenbo ........................... 395/105

FOREIGN PATENT DOCUMENTS 62-173526 7/1987 Japan .
63-254516 10/1988 Japan .
1-87363 3/1989 Japan .
2-70465 3/1990 Japan .

OTHER PUBLICATIONS

Nikkei Electronics, No. 417, Mar. 23, 1987, pp. 205-227.

Primary Examiner—Robert L. Richardson
Attorney, Agent, or Firm—Antonelli, Terry, Stout & Kraus

[57] ABSTRACT

A print control apparatus for controlling a page printer, such as a laser printer. The print control apparatus comprises a plurality of page buffers provided in units each corresponding to a page having a minimal or relatively small paper sheet size. A necessary numbers of page buffers are acquired and then released by a draw task or a print task according to the page size to be printed so that printing can be carried out even on large size paper sheets with less total capacity of the page buffers and printing can be carried out on average at the highest speed of the printer engine on small size paper sheets even if there is a page containing a lot of drawing data during a continuous printing operation.

8 Claims, 15 Drawing Sheets

PAPER SIZE AND NUMBER OF REQUIRED PAGE BUFFERS

| PAPER SIZE | No. OF REQUIRED PAGE BUFFERS |
|---|---|
| A 3 | 3 |
| A 4 | 2 |
| A 5 | 1 |
| A 6 | 1 |
| B 4 | 2 |
| B 5 | 1 |
| B 6 | 1 |

RESERVING PAGE BUFFERS ACCORDING TO VARIABLE LENGTH PAGE BUFFER CONTROL SYSTEM

FIG. 5(a)
PAGE BUFFER SUPERVISING TABLE 18

| | |
|---|---|
| 526 — CURRENT DRAWING PAGE BUFFER NO. | |
| 527 — CURRENT PRINTING PAGE BUFFER NO. | |
| 528 — PRESENT PRINTING PAGE BUFFER NO. | |
| LEADING ADDRESS OF PAGE BUFFER 0 | |
| LEADING ADDRESS OF PAGE BUFFER 1 | 51 DATA COMMON TO ALL PAGE BUFFERS |
| ⋮ | |
| LEADING ADDRESS OF PAGE BUFFER N-1 | |
| PAGE BUFFER SIZE (BYTE) | |
| 524 — CURRENT VALUE OF PRINTING CONDITIONS | |
| TOTAL NUMBER N OF PAGE BUFFERS | |
| 525 — UNRESOLVED COMMAND DATA | |
| 529 — PRINT TASK USING PAGE BUFFER DATA | |
| 521 — TASK RELATED DATA | |
| 522 — PRINTING CONDITIONS | 52 DATA ON PAGE BUFFER 0 |
| 523 — PRINTER MEMORY CONTROLLER SETTING DATA | |
| TASK RELATED DATA | |
| PRINTING CONDITIONS | 53 DATA ON PAGE BUFFER 1 |
| PRINTER MEMORY CONTROLLER SETTING DATA | |
| ⋮ | |
| TASK RELATED DATA | |
| PRINTING CONDITIONS | 54 DATA ON PAGE BUFFER N-1 |
| PRINTER MEMORY CONTROLLER SETTING DATA | |

FIG. 5(b)
TASK RELATED DATA 521

| |  |
|---|---|
| DRAWING/PRINTING STATE | 521-a |
| DRAWING TASK NO. USING CURRENT PAGE | 521-b |
| PRINTING TASK NO. USING CURRENT PAGE | 521-c |
| ROOT POINTER OF PAGE BUFFER FREE STATE WAITING QUEUE FOR CURRENT PAGE | 521-d |

FIG. 5(c)
PRINTING CONDITION 522 or 524

| |
|---|
| SHEET FEEDING UNIT CODE |
| SHEET OUTPUTTING UNIT CODE |
| PAGE SIZE DESIGNATING PARAMETER |
| PAGE LENGTH/BREADTH CODE |
| SINGLE/DOUBLE SIDED PRINTING |
| FRONT/REAR PRINTING |
| PAGE SERIAL NO. |
| TOTAL NO. OF COPIES OF EACH PAGE TO BE PRINTED |
| CURRENT COPY NO. OF EACH PAGE TO BE PRINTED |
| PRINTING DIRECTION (PORTRAIT/LANDSCAPE) |
| DRAWING ERROR PROCESSING MODE |
| CHARACTER EXPANSION MODE |

FIG. 5(d)
PRINTER MEMORY CONTROLLER SETTING DATA 523

| | |
|---|---|
| STATE OF PRINTER MEMORY CONTROLLER (READY/BUSY/FAULT) | |
| STATE OF CONTROL REGISTER | ⎫ |
| LEADING ADDRESS OF PAGE | ⎪ |
| LEFT MARGIN DOT NO. $L_m$ | ⎬ STATE OF PRINTER MEMORY CONTROLLER REGISTER |
| RIGHT SKIP LONG WORD NO. $R_m$ | ⎪ |
| TOP MARGIN DOT NO. $T_m$ | ⎪ |
| PAGE SIZE BREADTH LONG WORD NO. $W_x$ | ⎪ |
| PAGE SIZE HEIGHT DOT NO. $D_y$ | ⎪ |
| STATE OF STATUS REGISTER | ⎭ |

FIG. 5(e)

UNRESOLVED COMMAND DATA 525

| UNRESOLVED FLAG |
|---|
| UNRESOLVED COMMAND START ADDRESS |
| UNRESOLVED COMMAND ENDING ADDRESS |

FIG. 5(f)

DRAWING/PRINTING STATE 521-a

| STATE | CONTENT |
|---|---|
| FREE | UNOCCUPIED OR NOT USED (AFTER COMPLETION OF PRINTING, BEFORE START OF DRAWING) |
| DURING DRAWING | AFTER START OF DRAWING, BEFORE ORDER TO PRINT |
| PRINTABLE | AFTER ORDER TO PRINT, BEFORE ISSUING PRINTING INSTRUCTION |
| PRINTING START | AFTER ISSUING PRINTING INSTRUCTION, BEFORE READOUT FROM PAGE BUFFER |
| DURING PRINTING 1 | READING OUT FROM PAGE BUFFER (WITHOUT ZERO CLEAR) |
| DURING PRINTING 2 | READING OUT FROM PAGE BUFFER (WITH ZERO CLEAR) |
| LINKED USE | LINKED WITH ANOTHER PAGE BUFFER (REFER TO LEADING PAGE BUFFER OUT OF A SET OF CONSECUTIVE PAGE BUFFERS INCLUDING CURRENT BUFFER AS FOR DRAWING/PRINTING STATE) |

PRINTING TASK USING PAGE BUFFER DATA 529

RELATIONSHIP BETWEEN PRINTABLE AREA AND PRINTER MEMORY CONTROLLER SETTING DATA

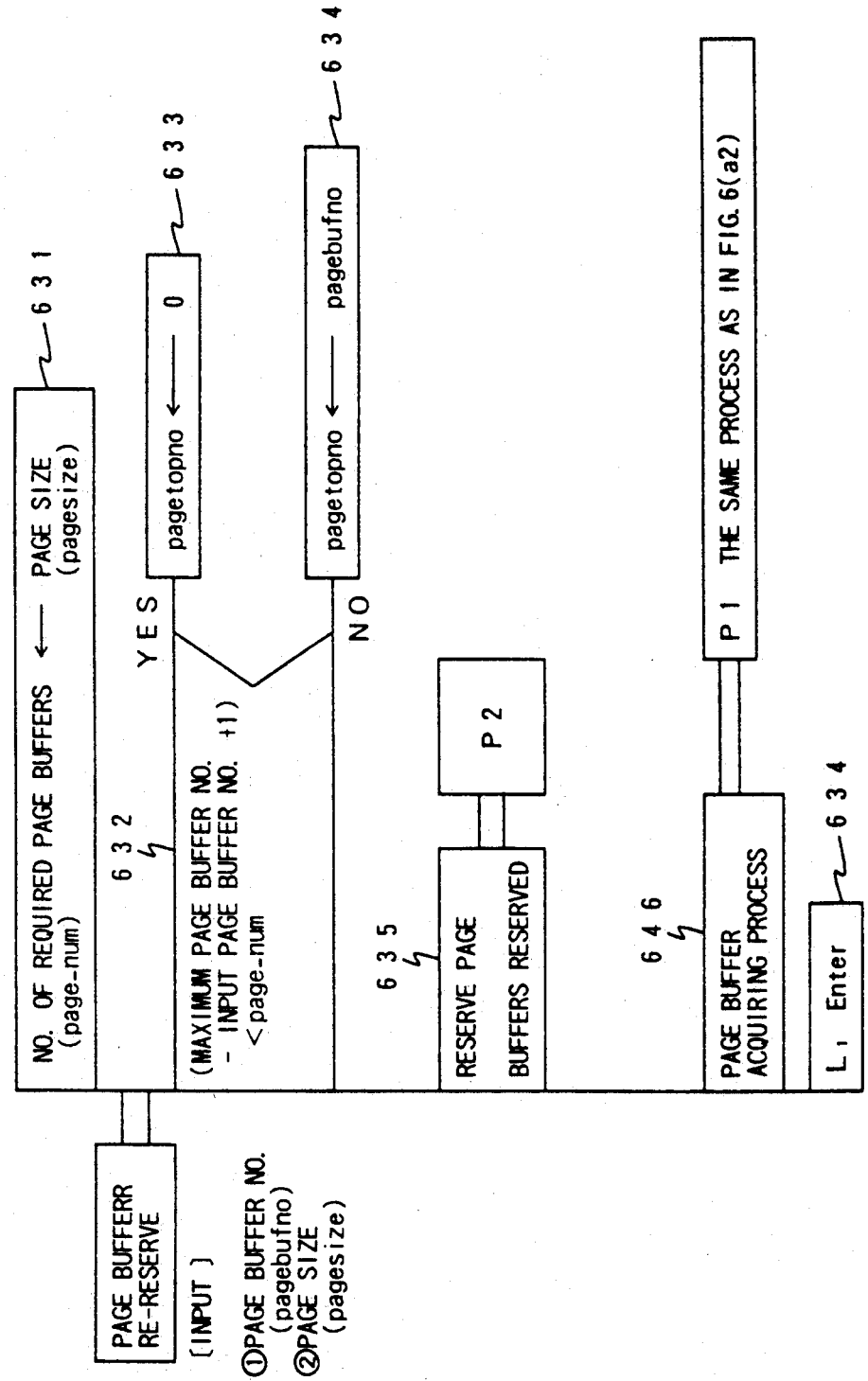

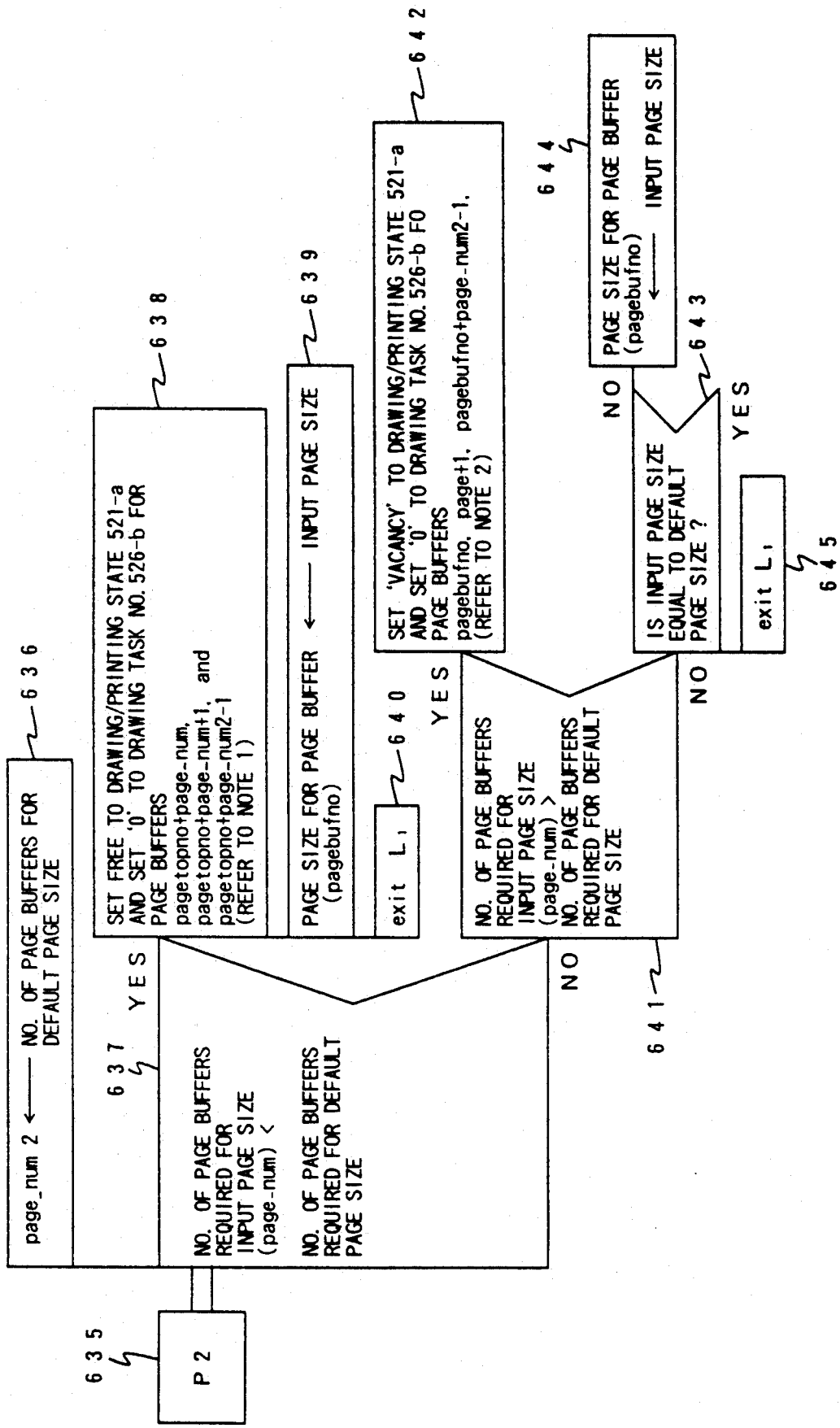

NOTE 1: ISSUED FOR DEFAULT PAGE SIZE

NOTE 2: ISSUED FOR CHANGED PAGE SIZE

ARRANGEMENT OF PAGE BUFFERS FOR A4 SIZE PAGE

ARRANGEMENT OF PAGE BUFFERS FOR A3 SIZE PAGE

PRINT CONTROL APPARATUS FOR PRINTING PAGES HAVING DIFFERENT PAGE SIZES USING ONE OR MORE OF A PLURALITY OF SAME-SIZED PAGE BUFFERS

This application is a continuation of application Ser. No. 605,280 filed on Oct. 30, 1990, now abandoned.

BACKGROUND OF THE INVENTION

1. Field of the Invention

This invention relates to a print control apparatus for controlling a page printer such as a laser printer, a light emitting diode (LED) printer and a liquid crystal shutter (LCS) printer, which are referred to as optical printers.

2. Related Art

Recently, optical printers have been extensively used in the field of information processing apparatuses such as a personal computer and a work station. An optical printer is generally connected to the personal computer or work station as a host computer via a print control apparatus.

One example of the conventional print control apparatus is exemplified in Japanese Patent Application Laid-Open Publication (KOKAI) No. 173526/1987, as shown in FIG. 2. In FIG. 2, a train of commands transmitted by a host computer is drawn as a dot pattern into a page buffer 23 by a central processing unit (CPU) 21. When the drawing for one page is completed, data in the first page 231 are read out by a printer adapter unit 24, is processed in a parallel-serial conversion, and then is outputted as a video signal to a printer engine unit 25. The printer engine unit 25 executes the optical printer process to print one page of the paper sheet.

In the above-cited print control apparatus, a plurality of pages 231, 232 and 233 are provided in the page buffer unit 23. Both the drawing and printing processes are carried out simultaneously by performing the printing (reading) to the printer engine unit 25 from the page 232 while performing the drawing (writing) to the page 231, thereby increasing the throughput.

In Japanese Patent Applications 158481/1988 and 164637/1989, the present inventors proposed print control apparatuses, in which both a page buffer memory for a plurality of pages and a printer engine are operated without any idle time and perform command reception, drawing and printing in an overlapped mode so as to carry out the printing operation to be a maximum speed of a printer engine.

With the foregoing conventional apparatuses, a fixed number N of page buffers having a predetermined size s are provided to perform the drawing and the printing. When a page size s1 is larger than the page size s mentioned above, no printing can be performed. To prevent such inconvenience, it is possible to provide the fixed number N of page buffers for the larger size s1. In such a case, the total capacity S of the page buffers will be increased to $s1 \times N$, which may lead to increase in the cost.

If the page size s1 is much smaller than the page buffer size s, it means that only part of the total page buffer capacity is in use. To be more specific, $\Delta = (s - s1) \times N$ of the page buffer area is not used. For example, assume that s stands for A3 size while s1 stands for A4 size. It follows that $\Delta = A4 \text{ size} \times N$.

SUMMARY OF THE INVENTION

It is therefore an onject of this invention to provide a print control apparatus which can solve inconveniences of conventional apparatuses, enable the printing to be performed, within the total capacity of the page buffer size, on a paper sheet whose page size is larger than the predetermined page buffer size, and increase the utilization ratio of the page buffer memory when the page size is smaller than the predetermined page size, so that the throughput will be increased.

According to this invention, there is provided a print control apparatus for controlling printing operation for a plurality of paper sheets having different page sizes. This print control apparatus comprises a plurality of page buffers provided in units each corresponding to a page having a minimal or relatively small paper sheet size, registering means for registering the number of said page buffers required for each of page sizes, and acquiring means for acquiring the required number of said page buffers for a designated page size.

In the print control apparatus, the same number of the page buffers may be acquired assuming that a current page size is valid unless there is a command for changing the page size.

In addition, the size of the unit of the page buffers is changeable, and the number of page buffers necessary for a changed page size is stored in the registering means either along with or in place of the number of the page buffers of unchanged page size.

In a second aspect of this invention, a print control apparatus which has a command buffer unit for storing a train of commands including a drawing command to be interpreted and executed by a task, and a page buffer memory for storing dot image data drawn according to said drawing command and which outputs to a printer engine unit dot image data in said page buffer memory after completion of drawing, the apparatus comprising: a plurality of page buffers provided in units of each corresponding to a page having a small memory capacity, the page buffers constituting said page buffer memory; a task processing means for executing a drawing process and a printing process as a drawing task and a print task, respectively; a page buffer supervising table means for holding page buffer supervising information; a printer supervising table means for holding printer supervising information; and a page buffer control means for reserving and freeing the necessary number of page buffers for each page size with reference to the page buffer supervising table means; wherein the page buffer control means allocates, to the current draw task, free page buffers necessary for a page size according to the content of the page buffer supervising table means in response to the request of the draw task for page buffers, and allocates, to the print task, print waiting that is printable page buffers and a free printer engine unit according to the contents of the printer supervising table means and page buffer supervising table means; and wherein the print task starts reading the contents of the necessary page buffers and outputting to the printer engine unit, and instructs the page buffer control means to release the page buffers when the print task finishes reading the contents of the necessary page buffers.

In a third aspect of this invention, a print control apparatus controls printing operations for various sizes of paper sheets and is able to change a density of printing dots. The print control apparatus comprises a plurality of page buffers provided in units each corresponding to a page having a minimum or relatively small paper sheet size and a low dot density, means for registering the number of page buffers for each page of paper sheets having various dot densities, and means for acquiring the necessary number of page buffers according to the designated dot density and the page size.

Further, the size of a unit of said page buffers changeable depending upon the dot density.

According to this invention, a minimum or relatively small paper sheet size is defined to be a unit of page buffer. To start a drawing process for a new document page, the draw task issues a processing request (PAGE BUFFER RESERVE) so as to reserve the necessary number of page buffers. Then a page buffer area having a number of the page buffer units according to the page size or sheet size, preferably having a set of consecutive page buffer units, will be acquired. Therefore, even if the page size s1 is larger than the predetermined page buffer size s in the prior art apparatus, both the drawing and printing processes can be carried out by reserving the necessary number of unit page buffers in the page buffer memory so long as the capacity of necessary unit page buffers does not exceed the total capacity of the page buffers.

Even when the page size s1 is much smaller than the predetermined page buffer size s (in the conventional apparatus), $n1 = S/s1$ page buffers can be reserved as a drawing area for the page size s1 by defining the page size s1 as one unit of page buffers. The number of the reserved page buffers can be increased compared with the fixed number N of the page buffers reserved in the conventional apparatus. Therefore, even when there is a document page having a large amount of drawing data during a continuous printing operation of a plurality of document pages, which is canceled on average so as to perform printing at the highest speed of the printer engine.

Here the term "a document page" stands for a page of one paper sheet on which printing in performed by the cooperation of the print control apparatus and the printer engine. On the other hand, each unit page buffer in the page buffer memory is referred to as a page buffer or a page.

As described above, the necessary number of the page buffers are reserved and freed according to the page size of a sheet of paper so that printing can be performed on a sheet of large page size with less total capacity of the page buffers. In addition, if there is a page containing a lot of drawing data while printing on sheets of small page size, the convenience is canceled on average with virtually increased number of page buffers, thereby enabling the printing to be carried out at the highest speed of the printer engine, and improving the cost performance, usability and throughput of the print control apparatus.

BRIEF DESCRIPTION OF THE DRAWINGS

FIGS. 5(a) to 5(h) are views showing the configuration of page buffer supervising table units;

FIGS. 6(c1) and 6(c2) are PAD drawings illustrating a page buffer re-reserve process;

DETAILED DESCRIPTION

Figures 3A, 3B:
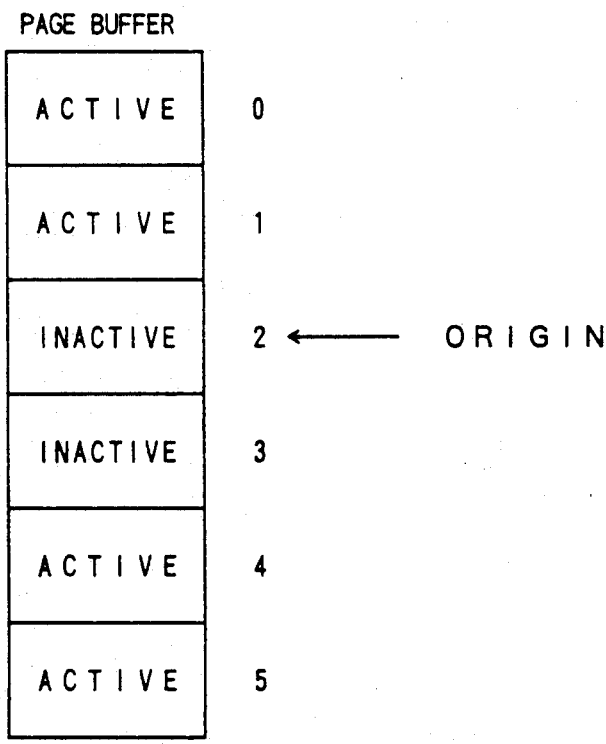
FIGS. 3(a) and 3(b) are views showing a variable length page buffer control system according to this invention.
Figure 4:
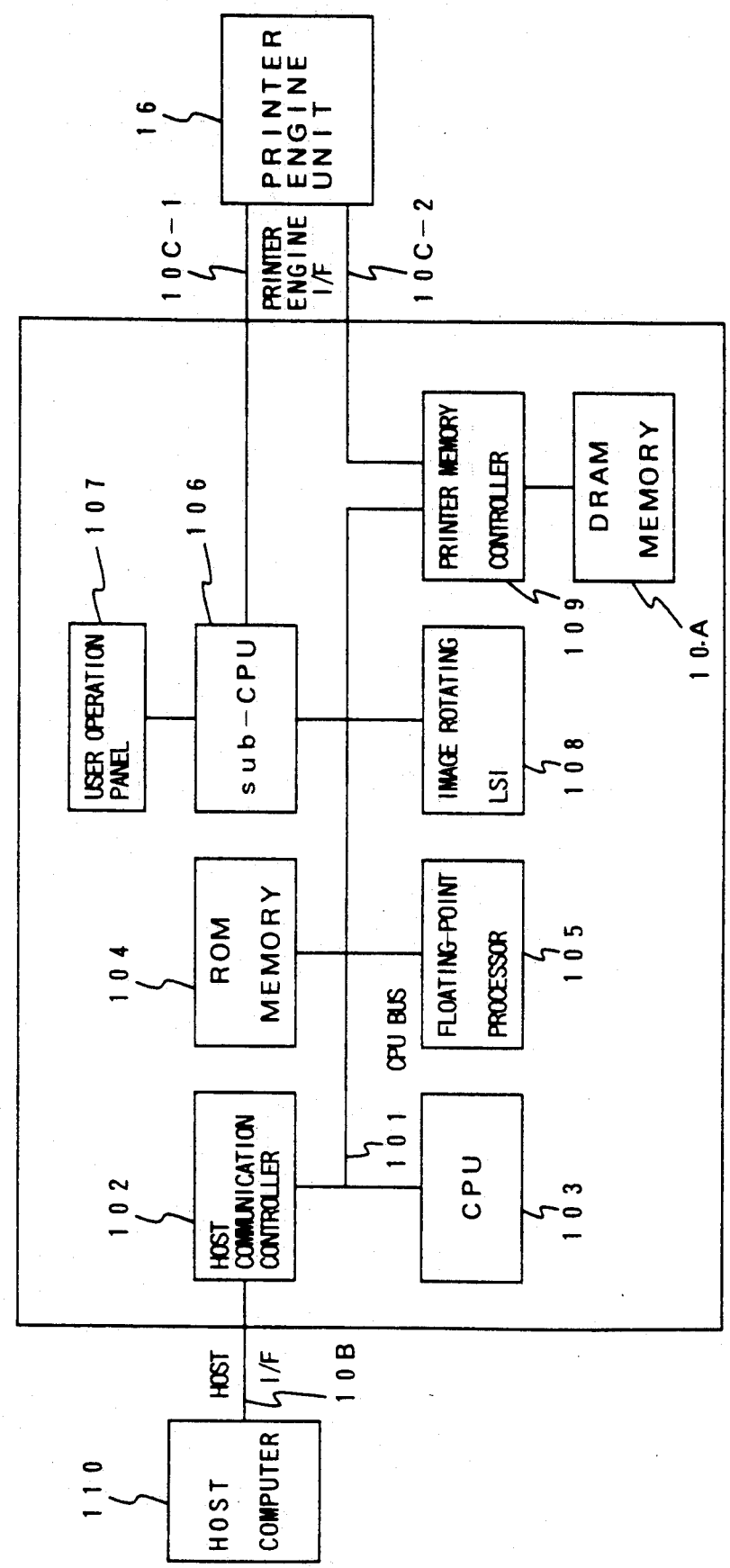
FIG. 4 is a block diagram showing the configuration of hardware of the print control apparatus.

The principles of this invention are particularly useful when embodied in a print control apparatus such as shown in FIG. 4. First, the variable length page buffer control system which is the gist of this embodiment will be described with reference to FIGS. 3(a)-3(b).

(i) A page buffer memory comprises a pluality of units of page buffer. The capacity of one unit page buffer or page is determined to meet a size having a small memory capacity, such as B5 or A6 size. For example, a page buffer memory comprises six regions each allocated for a B5 size page as illustrated in FIG. 3(b).

(ii) By the page buffer reserve/free processes, a set of the page buffers determined according to a page size is continuously reserved and freed from the page buffer which is an origin at the moment. The current drawing page buffer No. 526, shown in the page buffer supervising table 18 shown in FIG. 5(a) and to be described later, is used as the origin for reserving the page buffers while the present printing page buffer No. 528 under printing operation is used as the origin for the page buffer free process.

FIG. 3(a) shows the relationship between the page sizes and the number of the page buffers necessary for each page size. One A3 size page and one B4 size page require three page buffers and two page buffers, respectively. In this example, the number of the page buffers is the same both for the length and breadth of the sheet, i.e. regardless of paper sheet orientation. This may be changeable. The information concerning the correspondence between the page sizes and the number of necessary page buffers can be retained as a table in a page buffer control unit 116 shown in FIG. 1 to be described later, or be retained in the program. In hardware, this information will be stored in such as ROM memory 104 or DRAM memory 10A illustrated in FIG. 4.

(iii) In the example of FIG. 3(b), since there are two free page buffer regions, the page buffers can be reserved for the page size of B4 size or smaller. However, the page buffers cannot be reserved for the A3 size page. In this case, page buffers for the A3 size page will not be reserved until the fourth page becomes free.

(iv) In the example of FIG. 3(b), when No. 5 page buffer is used as the origin for drawing, page buffers for two or more pages cannot be reserved in series. Therefore when reserving page buffers for a page size larger than A4 size, No. 5 page is skipped and page buffers will be reserved by making No. 0 page as the origin (current drawing page buffer No. 526).

(v) In the example of FIG. 3(a), although the B5 page size is assumed to be one unit page size, a relatively small page size such as A6 or B6 size can be made as one unit page. In addition, it is also possible to provide means that allows a user to select an A-series or B-series size page as one unit page according to his purposes.

The configuration of hardware of the print control apparatus will be described with reference to FIG. 4.

The print control apparatus comprises a CPU bus 101, a host communication controller 102, a CPU 103, a ROM memory 104, a floating-point processor 105, a sub-CPU 106, a user operation panel 107, an image rotating LSI 108, a printer memory controller 109, and a DRAM memory 10A.

The CPU bus 101 includes various input/output signals (address signal, data signal, and other control signals). Through the CPU bus 101, the CPU 103 receives and transmits input/output data from and to peripheral controllers 102, 105, 106, 108 and 109, and memories 104, 10A.

The host communication controller 102 enables the print control apparatus to communicate with the host computer 10. The host communication controller 102 (referred to as host I/F hereinafter) comprises a physical I/F such as the small computer system interface (SCSI), RS232C, RS422, or general purpose interface bus (GP-IB), Centronics, or high-level data link control (HDLC). The physical I/F will be selected according to the hardware logic of the host I/F.

The ROM memory 104 stores the initial loading program (IPL) for initializing the print control apparatus, and a part of character fonts.

The DRAM memory 10A stores (i) the control program for the print control apparatus, (ii) the remainder of the character fonts, (iii) memory data in command buffer unit, (iv) memory data in page buffer memory, and (v) various supervising tables such as a task supervising table, a page buffer supervising table, a printer supervising table, or the like. The IPL program downloads the above items (i) and (ii) from the host computer 10, and stores them in the DRAM memory 10A. Otherwise, (i) and (ii) can be stored in the ROM memory 104 beforehand without being stored in the DRAM memory 10A. It is also possible that all the character fonts can be stored in the DRAM memory 10A without being stored in the ROM memory 104.

The floating-point processor 105 performs the floating-point calculation as instructed by the CPU 103. The image rotating LSI 108 performs the rotating process of the drawing output according to the instruction of the CPU 103 while the CPU 103 performs the drawing process of the characters or images on the page buffer unit memory. Therefore, the drawing process will be accelerated in the floating-point processor 105 and the image rotating LSI 108. Although the drawing process will be slowed down, this processing can be executed by the CPU 103 without using the floating-point processor 105 and the image rotating LSI 108.

The sub-CPU 106 performs the input/output operation between the user operation panel 107 and the printer engine unit 16 according to the instructions from the CPU 103.

The printer memory controller 109 reads the content (usually the contents of the page buffer memory) of the DRAM memory 10A to the printer engine unit 16, and controls (refreshes) the DRAM memory 10A. The controller 109 performs the readout process by means of a DMA (direct memory access) function. When data for one page is read out from the page buffer memory, the printer memory controller 109 asserts an interrupt signal (a part of the signals in the CPU bus 101) for the CPU 103, thereby allowing the CPU 103 to start the page-buffer-readout-end interrupt process.

According to the printer engine I/F, the printer engine unit 16 communicates with the sub-CPU 106 via a signal line 10C-1, and communicates with the printer memory controller 109 via a signal line 10C-2. The signal line 10C-2 carries an image output signal to let the printer memory controller 109 read the content of the page buffer memory to the printer engine unit. The signal line 10C-1 carries control signals to enable the sub-CPU 106 to transmit inquiry and instruction commands to the printer engine unit 16, and signals to control the procedure for reading the content of page buffer memory to the printer engine unit 16. When the sub-CPU 106 detects that it is possible to issue the printing instructions to the printer engine unit 16, the sub-CPU 106 asserts the aforementioned interrupt signal to the CPU 103 so that the CPU 103 starts the printing-instruction-allowance interrupt process.

Figure 1:
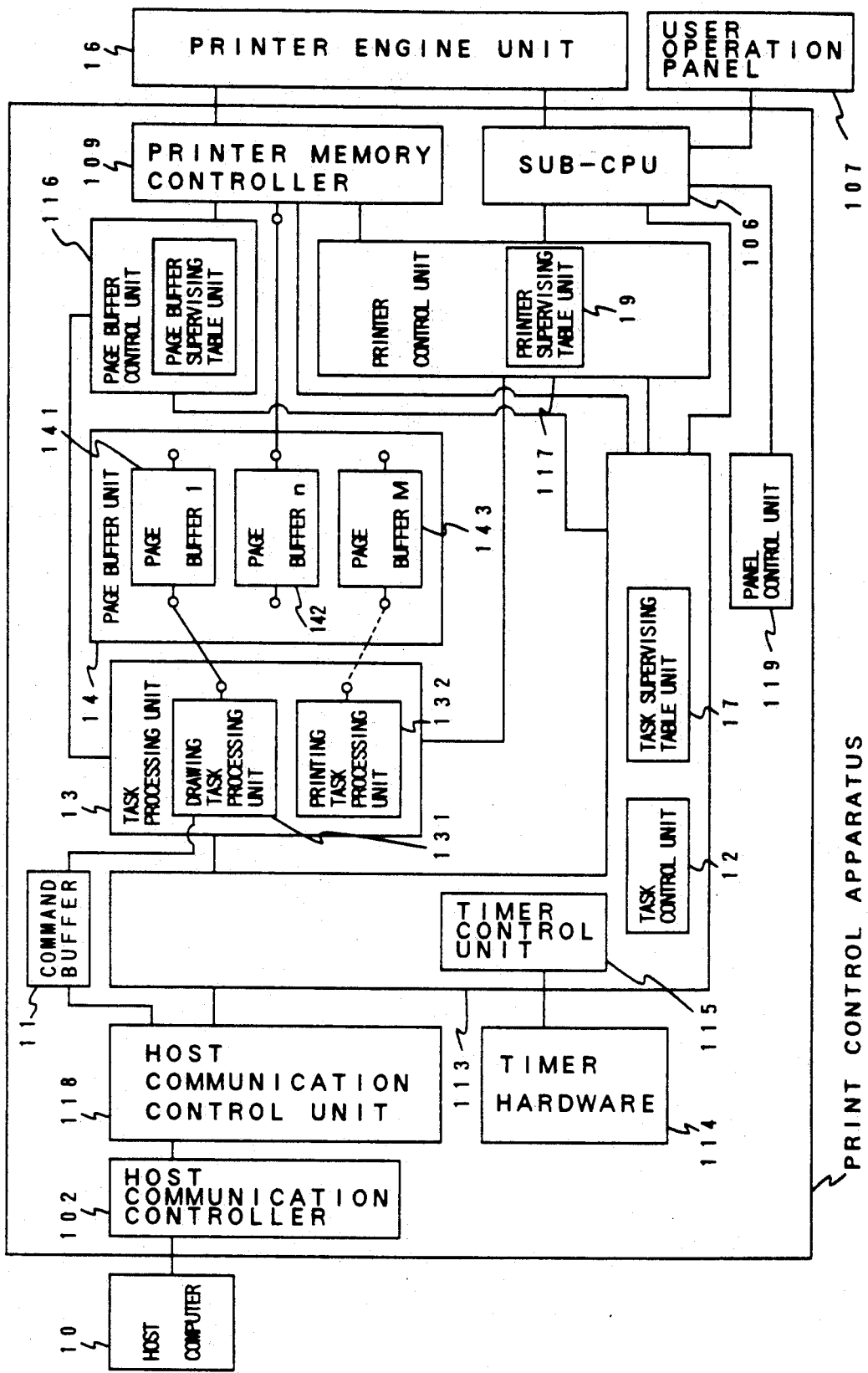
FIG. 1 is a block diagram of a print control apparatus according to one embodiment of this invention.
Figure 2:
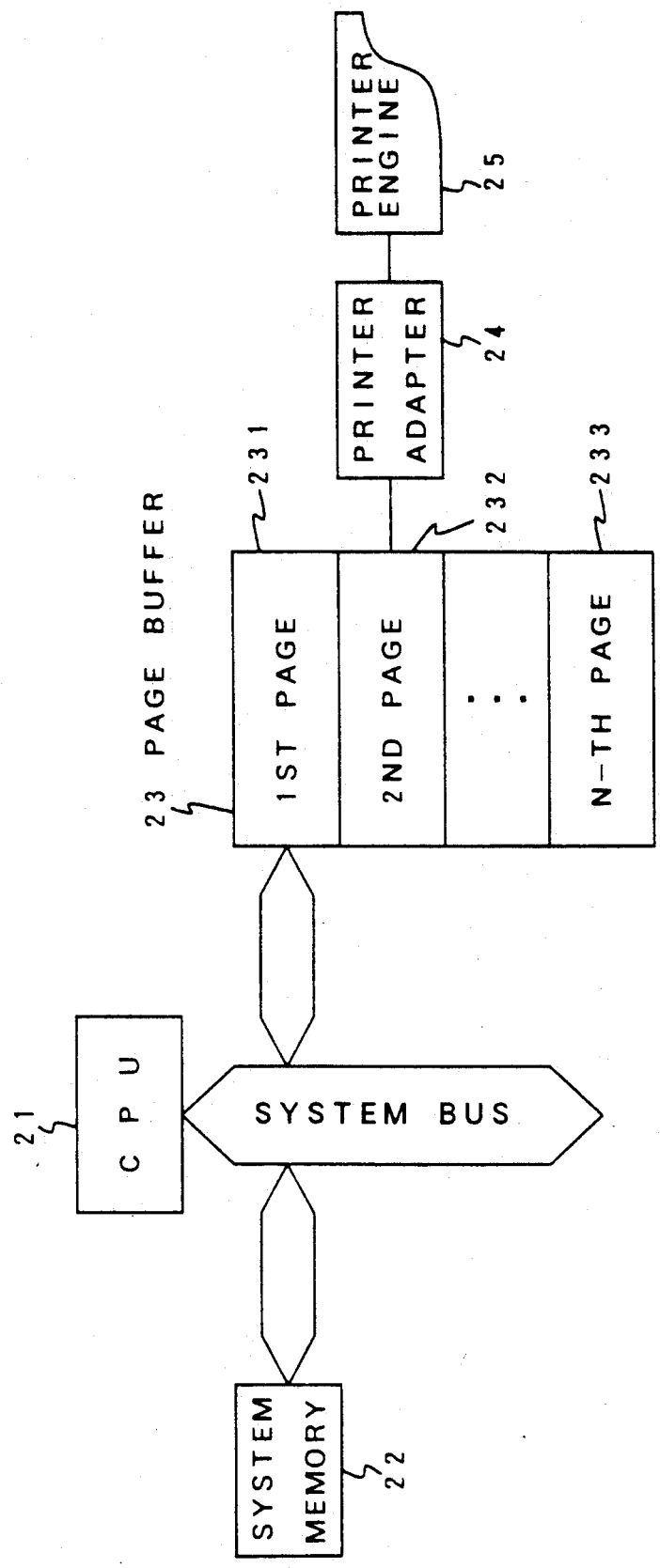
FIG. 2 is a block diagram of a conventional print control apparatus.

The configuration of the print control apparatus will be described with reference to FIG. 1. In FIG. 1, the CPU of FIG. 4 is shown as functional blocks, which include a kernel unit 113, and various device drivers, i.e., a page buffer control unit 116, a printer control unit 117, a host communication control unit 118, a panel control unit 119, a command buffer unit 11, a page buffer memory 14, and task processing unit 13.

The kernel unit 113 comprises main routines for processing various SVCs (supervisor calls), main routines for various interruption processing, a task control unit 12, a task supervising table unit 17, and a timer control unit 115. The various SVCs are service functions for controlling task, timer, page buffers, printer, host communication, and panel.

The kernel unit 113 accepts the SVC commands as the CPU command, analyzes and identifies their factors based on input parameters of the SVC, and then starts respective SVC processing routines in the control units 12, 115, 116, 117, 118 and 119 to execute the individual SVC. Various interruption processes include a timer interruption from a timer hardware 114, a page buffer control interruption from the printer memory controller 109, a printer control interruption from the printer memory controller 109 and the sub-CPU, a host communication interruption from the host communication controller 102, and a panel control interruption from the sub-CPU 106. The kernel unit 113 analyzes and identifies the interruption factors, and starts respective interruption handling routines in the control units 115, 116, 117, 118 and 119 so as to enable them to execute the interruption processes.

Referring to the task supervising table unit 17, the task control unit 12 executes the task control macro function according to the start requirement (issuance) from various units of the print control apparatus. The start request (issuance) is issued by a draw task processing unit 131, a print task processing unit 132, and various device drivers 116, 117, 118 and 119.

Various functions (e.g., task start, event occurrence wait macro) are considered to be macro instructions, and they are referred to as the task start macro and event occurencerrence wait macro. When these task control macros are called from respective tasks in the task processing unit 13, they are called as SVCs, and are referred to as the task start SVC and event occurrence wait SVC by attaching a suffix SVC. On the other hand, when these task controlling macros are called for the SVC processing or the interruption processing from the printer control unit 117, page buffer control unit 116, host control communication unit 118, and panel control unit 119, they are simply referred to as the task start macro or the event occurrence wait macro without the suffix SVC since they are called as sub-routines.

The timer control unit 115 supervises the end of various events by using the timer hardware 114, e.g., supervises the end of sheet outputting (of the cut type paper sheet). The timer control unit 115 performs the end supervision when the device driver 131, 132, 116, 117, 118 or 119 of the print control apparatus issues the end supervising macro. The device drivers 116, 117, 118, 119 have the following functions.

The page buffer control unit 116 prepares the SVCs such as PAGE BUFFER RESERVE, and PAGE BUFFER FREE shown in TABLE 1, and performs the resource management or the free state management of the page buffers composing N pages with reference to the page buffer supervising table unit 18. The page buffer control unit 116 also carries out a respective interruption process referred to as the page-buffer-readout-end interruption process according to interruption from the printer memory controller 109 as shown in TABLE 2.

Tasks in the task processing unit 13 issue the page buffer controlling SVCs, and requests the page buffer control unit 116 to control the page buffer unit 14.

The printer control unit 117 prepares SVCs such as the PRINTER RESERVE, PRINTER FREE and PRINTING INSTRUCTION as shown in TABLE 3, and performs the resource management (free state management) and the input/output control with the printer engine unit 16 with reference to the printer supervising table unit 19. As shown in TABLE 4, the printer control unit 117 also performs respective interruption processes such as the printing-instruction-allowance-interruption process, the page-buffer-readout-start interruption process and the sheet-output-end-timer interruption process according to the interruption instructions from the sub-CPU 106 and the timer hardware 114.

Each task of the task processing unit 113 issues the printer controlling SVC so as to request the printer control unit 117 to perform the resource management of the printer engine unit 16 and to perform the input/output control with the printer engine unit 16.

The host communication control unit 118 performs the respective SVC processing and respective interruption processing so as to control the host communication controller 102.

The panel control unit 119 performs the respective SVC processing and respective interruption processing so as to control the user operation panel 107 via the sub-CPU 106.

The page buffer control unit 116 and the printer control unit 117 are effective in the following three points.

(1) The resource management and input/output control of the page buffer unit 14 and the printer engine unit 16 can be carried out separately from the task processing unit 13. In other words, the page buffer control unit 116, the page buffer supervising table unit 18, the printer control unit 117, and the printer supervising table unit 19 are provided for controlling the page buffer memory 14 and the printer (the printer engine unit 16 and the sab-CPU 106). Therefore, the page buffer unit and the printer can be controlled independently of the CPU and task control, and task processing.

(2) Due to the effect in item (1), when a printer engine unit 16 of a different type is connectable to the print control apparatus, or when the specification of the print control apparatus is changed with respect to the capacity of the page buffer memory 14 or the total number N of page buffers, only parts of the page buffer control unit 116 or the printer control unit 117 will be modified to cope with the change without changing the content of the task processing unit 13.

(3) The task processing unit 13 performs its processing operation while keeping the CPU at the task level (the lowest interruption level 1) and in the system mode, and performs processing of the device drivers 116, 117, 118 and 119 while keeping the CPU at the interrupt ion level m higher than the task level (m > 1), and in the user mode.

The supervising tables 17, 18, 19 are put under the exclusive control so as to prevent the task processing units from operating the tables. Therefore, reliability of the control program of the print control apparatus will be improved.

The details of this embodiment will be described with reference to FIG. 1.

The train of commands received from the host computer 10 in FIG. 1 is stored in the command buffer unit 11. Each page is defined as one or more commands, which are received from the host computer. The command stored in the command buffer unit 11 is processed by the draw task processing unit 131 in the task processing unit 13. The draw task processing unit 131 issues a page buffer reserve SVC prior to processing of the page buffer No. to be drawn next (referred to as the current drawing page buffer No.) by inputting the current drawing page buffer No. in question which serves as an origin, and the page size. The page buffer reserve SVC is carried out to reserve a set of page buffers having continuous addresses according to the page size through the processes (1) to (5) shown in the Function column in TABLE 1.

After receiving the necessary number of page buffers by means of the page buffer reserve SVC, the draw task interprets and executes the command train in the command buffer unit 11 as they are received, draws the characters, graphics and images into dot image form on the set of reserved continuous page buffers (e.g., page buffer n and n+1). When detecting a page break condition {a command explicitly indicating the break of page, e.g. form feed, or a command implicitly indicating the break of page, e.g. page size, printing orientation (either portrait or landscape)}, the draw task processing unit 131 completes the draw process for the object page buffer, and starts the print task for the current printing page buffer No.

Sometimes the command buffer unit 11 is empty when the draw task tries to read the content of the command buffer unit 11 so as to interpret the command. In such a case, the draw task issues an event occurrence wait SVC in order to put itself into a command receipt wait state. The draw task is released from the command receipt wait state when the host communication control unit 118 receives the commands from the host computer 10 via the host communication controller 102 with an event occurrence wait release macro issued.

Since the draw task is put into the command receipt wait state if the command buffer unit 11 is empty, another task will be executed, thereby enabling the CPU to be utilized without any idle time. Further, when detecting the command buffer unit 11 empty, the print control apparatus informs this fact to the host computer 10 via the host communication control unit 118. As soon as knowing empty state of the command buffer unit 11, the host computer 10 sends commands to the print control apparatus, which processes the commands immediately. A document exceeding the capacity of the command buffer unit 11 can be printed with a high throughput by utilizing the command buffer unit 11 without any idle time.

The print task is provided with a priority higher than the draw task is as described later. The print task is immediately executable when it is started by the draw task by means of the task start SVC. In other words, a task dispatcher selects and starts the print task as a next task to be executed, and the previous draw task is returned to the ready state.

The contents of the print task process unit 132 will be described hereinafter. The print task processing unit 132 first issues the printer reserve SVC which is one of the functions of the printer control unit 117. The printer reserve SVC sets the printing instruct allowance flag in the printer supervising table 19 to "not ready" and registers in the table 19 the task number of the print task which issues the printer reserve SVC as a user of the printer, (1) if the printer engine unit 16 is ready for accepting the print instruction (i.e., the printing instruct allowance flag on the printer supervising table unit 19 is "ready enable"), and (2) if none of the print tasks is using the printer (i.e., the task number using the printer on the table 19 is empty).

Unless at least one of the conditions (1) and (2) is established in the printer reserve process, the SVC process starts the free resource wait macro which is one of the functions of the task control unit, moves the print task issuing the SVC from the running state to the printer free waiting state, connects the print task to the printer free waiting queue, and starts the task dispatcher. The task dispatcher then selects and starts a next task to be executed.

When the printer is reserved by the printer reserve SVC, the print task confirms that the drawing/printing state 521-a of the page buffer for the current printing page buffer No. 527 is in the printable state, and issues a series of printer controlling SVCs (the ready condition confirmation SVC, sheet feed unit check SVC, sheet feed unit instruction SVC, sheet output unit check SVC, sheet output unit instruction SVC, and printing instruction SVC).

The printer controlling SVCs except for the printer reserve SVC and printer free SVC perform a series of the input/output processes with the printer engine unit 16 according to the video interface via the sub-CPU 106 and the printer memory controller 109. Then the print task outputs the dot image data in the page buffer 9 e.g. 142) to be printed to the printer engine unit 16 as a video signal.

In the printing instruct SVC process of the printer control SVCs, the event occurrence wait macro for the task control is used to move the SVC issuing task (i.e., the print task) to the printing-instruction-allowance-wait state.

The print task issues the printer free SVC after a series of the printer controlling SVC is repeated according to the total number of copies of each page to be printed. The printer free SVC puts the printing instruction allowance flag to the "ready" state, empties the print task number using the printer. If there is a task under the printer-free-waiting-state, the free-resource-wait-release macro is issued to the printer free waiting queue, and all the tasks in this queue are returned to the ready state.

As described above, while the first print task is repeatedly issuing a series of the printer controlling SVCs for a certain page buffer according to the total number of copies of each page to be printed, the print task retains the right to use the printer. As soon as the above printing process is completed, the print task issues the printer free SVC and cancels the right to use the printer. If the print task does not retain the right to use the printer for printing total number of copies, the following phenomena may occur. That is, if a second print task is permitted to issue another series of the printer controlling SVC for another page buffer while the first print task is repeating to issue a series of the printer controlling SVC, two printer controlling SVCs are simultaneously issued, so that the printed matter might be mutilated. This is the reason why printer reserve SVC and printer free SVC are issues from the print task.

After the issuance of the printer free SVC, the print task is moved to the sheet-output-end-waiting state by means of the event occurrence wait SVC. The sheet-output-end-waiting state is released when the event-occurrence-release macro is issued in the timer expiration interruption process (referred to as the sheet-output-end timer interruption process) of a sheet-output-end-supervising timer which is activated by the page-buffer-readout-start interruption process.

Released from the sheet-output-end-waiting state, the print task issues a task end SVC and completes its processing operation.

When the printing instruction for the printer engine unit 16 becomes feasible, the sub-CPU 106 activates the printing-instruction-allowance interruption process in the printer control unit 117. When the necessary number of the page buffers is read according to the page size (e.g., page buffer n, and page buffer n+1), the printer memory controller 109 starts the page-buffer-readout-end interruption process in the page buffer control unit 116.

In the printing-instruction-allowance interruption process, the print task under the printing-instruction-allowance-wait state is returned to the ready state by means of the event occurence wait release free macro. As a result, when there are further copies of the page to be printed during the multiple page printing of two or more pages, this interruption process enables the print task to issue the printing instruction. At an instant the printing instruction becomes fearible and the print task is in the ready state, the print task repeatedly issues the series of printer controlling SVC so as to instruct the printing of the remaining copies of the page. Therefore, the same one page can be repeatedly copied on a plurality of pages at the fastest throughput of the printer engine.

When there is no further copy of the page to be printed, the print task (referred to as the task A, for example) issues the printer free SVC. If a print task (referred to as the print task B for example) is under the printer-free-wait state to print a succeeding page, the print task B is released from the printer-free-wait state no sooner than the print task A issues the printer free SVC. The print task B is released from the printer-free-wait state, reserves the free printer, and issues a series of the printer controlling SVC.

Therefore, the printing of different continuous pages can be carried out at the fastest throughput of the printer engine.

During the multiple page copying of the same one page or continuous printing of different pages, it is also possible to issue, as a series of the printer controlling SVC, only the printing instructing SVC (by omitting issuance of the ready condition confirmation SVC, sheet-feed-unit check SVC, sheet-feed-unit instruction SVC, sheet-output-unit check SVC, and sheet-output-unit instructing SVC). In this case, it is possible to issue the printing instructions for the printer engine unit at the shortest time interval acceptable for the printer engine unit, thereby increasing the throughput of the printer extensively.

In the page-buffer-readout-end interruption process, as soon as the page buffer is read out total number of times for the page, the page buffer free macro is issued using the present printing page buffer No. 529 and the size of the page being printed as an input data. In the page buffer free macro process, a set of the page buffers determined according to the page size is freed by means of the steps (1) to (3) shown in the Function column of TABLE 1. This macro returns all the tasks under the page buffer free wait state to the ready state by issuing the free resource wait release macro.

When the page buffer free macro is issued at the above-described timing, the draw task under the page buffer free wait state reserves page buffers as soon as they become free. Then the draw task can carry out the draw process.

When (a) means for reserving/freeing a set of consecutive page buffers necessary for the input page size by means of the page buffer reserve/free macro in the page buffer control unit, (b) means for issuing the page buffer reserve macro by means of the draw task, and (c) means for issuing the page buffer free macro by means of the page buffer readout end interruption process are installed and are operated as described above, printing on a paper sheet having a large page size can be performed by using the page buffers having a small total capacity. In addition, if a page containing a large amount of drawing data is mixed in a document to be printed on paper sheets of a small page size, such inconvenience is canceled by using the page buffers as the increased number of page buffer regions, so that the printing can be carried out at the highest speed of the printer engine, improving the cost performance, throughput and usability of the print control apparatus.

The units except for the page buffer control unit 116 shown in FIG. 1 have the functions and configurations as disclosed in Japanese patent application No. 164637/1989 proposed by the inventors.

The task processing unit executes tasks No. 1 to No. 16 shown in TABLE 5. These tasks are an embodiment for the case when SCSI is used as a communication I/F between the host computer and the print control apparatus. A communication I/F of a different kind is also applicable similarly.

In TABLE 5, the idle task is carried out when the other tasks are not in the ready state. The mode sense task execute the MODE SENSE command, received from the host computer 10. The suspend task and the cancel task respectively suspend and cancel the print processing, i.e., the draw task and the print tasks, of the print control apparatus. Both of these tasks are started by the task start macro which is one of the task control functions, when (1) host communication control unit receives the SCSI command from the host computer 10, (2) the panel control unit 119 receives key-inputted data from the user operation panel unit 107, or (3) the units 13, 116, 117, 118 and 119 of the print control apparatus performs the emergency process.

The draw task is used to execute the SCSI command referred to as the PRINT command. The PRINT command includes, in its data part, a series of commands representing the actual content to be drawn and printed (e.g., (1) escape sequence to control an ordinary printer, (2) command sequences such as CGI, ODA in ISO, and (3) drawing and printing contents indicated by the page description language, for example Post Script).

Even if the kind of commands are changed or added, only the alternation of the draw task is needed. The host communication control unit 118 receives the PRINT command from the host computer 10, and temporarily stores the command in the command buffer unit 11 together with the data. The draw task reads the commands from the command buffer unit 11, and interprets and executes the commands. The draw task performs similar processing when the host communication control unit 118 directly receives the series of commands (1), (2) and (3) without using the PRINT command of SCIC and stores them in the command buffer unit 11.

The print tasks are used to perform the print process for respective page buffers to which the draw process has been completed. A plurality of the print tasks are provided to print the respective pages simultaneously (ten print tasks in the example shown in TABLE 5). The total number of the print tasks is set at the maximum value to be executed simultaneously in the print control apparatus. To be more specific, the total number of the print tasks corresponds to the maximum number of paper sheets which are present at an arbitrary time point between the sheet feeding unit and the sheet outputting unit of the printer. This total number depends upon the specification of the printer engine unit 16.

The priority of the tasks is determined as shown in TABLE 5. The smaller values are assigned to the tasks having higher priorities. The tasks except for the draw task and the print task are provided in the task processing unit 13.

The content of the page buffer supervising table unit 18 will be described with reference to FIGS. 5(a) to 5(h). The table unit 18 is used to enable the respective tasks to get access to the page buffer memory 14 without errors in order, so that when the draw task performs the writing into the page buffer memory 14 including a plurality of pages and the print task performing the reading out the page buffer memory 14, not only paper sheet having different sizes are continuously processed but also the page buffer unit 14 is used without any idle time.

FIG. 5(a) shows the overall configuration of the page buffer supervising table unit 18. The data 51 common to all the page buffers is used to write the page buffer number to be written next by the draw task (referred to as the current drawing page buffer No. 526) the page buffer number to be read out next by the print task (the current printing page buffer No. 527), the present printing page buffer No. 528, the leading addresses of page buffers 0, 1, . . . N−1, current value of printing conditions 524, unresolved command data 525, and so forth.

The current value of printing conditions 524 is used to store the default values at the time when the draw task establishes the printing conditions for respective page buffers. To be more specific, when establishing the printing conditions for a page buffer (the page buffer 0 for instance), the draw task copies the current value of printing conditions 524 in the printing condition field 522 of the page buffer, and sets the value as a default value (this is done by the page buffer reserve). Then various printing conditions which are instructed to be modified with respect to the page buffer (e.g., sheet feeding unit code, sheet outputting unit code, page size designating parameter, total number of copies of each page to be printed) are updated and are set in the printing condition field 522 and the current value of printing conditions field 524.

The unresolved command data 525 (FIG. 5(e)) are used when a part of the commands is stored in the command buffer unit 11 and it is necessary to receive the succeeding commands from the host computer 10 in order to continue interpretation and execution of the command.

Figure 5G:
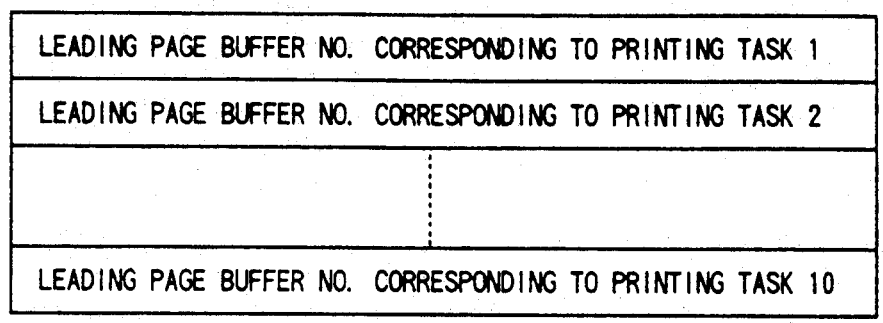

As shown in FIG. 5(g), the leading page buffer number corresponding to each print task is entered in the print-task-using-page-buffer data 529. To be more specific, the leading page buffer number corresponding to the print task (the leading page buffer number of a set of consecutive page buffer series corresponding to the size of the page to which the drawing is completed) is entered in this area. The print task knows the leading page buffer number out of the set of consecutive page buffer series to be printed by referring to this area when carrying out the print process.

The task related data 521, printing conditions 522, and printer memory controller setting data 523 are entered for each page. The contents of these data 521 to 523 are shown in FIGS. 5(b) to 5(d).

As for task related data 521, the drawing/printing state 521-a of each page is depicted as "free (drawable)", "during drawing", "printable (effective)", "print start", "during printing 1", "during printing 2", and "linked use" in as shown in FIG. 5(f). In addition, the task number of the draw task and the print task using the individual page buffers (521-b and 521-c) are also depicted, respectively. The root pointer 521-d of free state waiting queue for each page is also included in the task related data 521.

The draw task writes, in the printing conditions 522, data related to the page size and data related to the sheet feed and sheet output units instructed by part of the command series, and the print task performs printing by using these data.

Figure 5H:
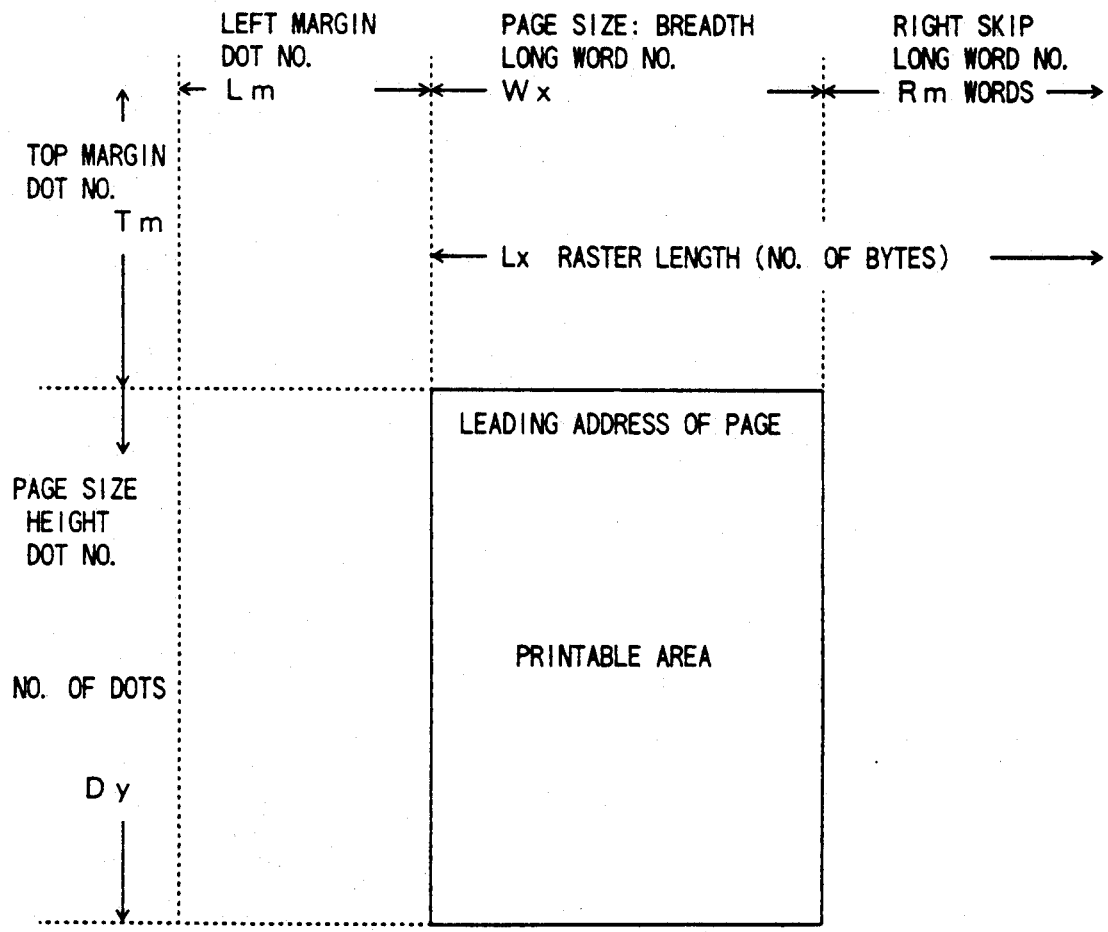

The printer memory controller setting data 523 include data concerning the state of the printer memory controller, and the register setting value to the printer memory controller corresponding to the page size. FIG. 5(h) shows the relationship between the printable area and the printer memory controller setting data.

The page buffer supervising table unit 18, which is used to reserve and free page buffers for a plurality of pages n at a time according to the page size, has the following three features at the time accessing to the table unit 18. The print control apparatus of this invention differs in these features from the apparatuses disclosed in the Japanese patent applications 158481/1988 and 164637/1989.

(i) When a set of consecutive page buffers for 2 or more pages are reserved according to the page size, the drawing/printing state of the leading page buffer is sequentially switched to "free", "during drawing", "printable", "print start", "during printing 1 (only for multiple page copying), and "during printing 2". The drawing/printing state for the second and succeeding page buffers are set to "linked use", when the task obtains the set of page buffer. They are made "free", when the task releases those page buffers.

(ii) As for the drawing task No. 521-b using the page in question, the values of all the pages for a set of page buffers corresponding to the page size are set/reset in the reserve/free process by the page buffer reserve/free macro.

(iii) The content of the printer-memory-controller setting data 523 for the leading page buffer in the set of consecutive page buffers (for n pages) corresponding the page size is set in the printer memory controller 109 so as to start the controller 109.

When changing or modifying a size of page buffer to be a unit of page buffer, related parameters such as the leading address of the page buffer 0 and succeeding page buffers, page buffer size, and total number N of the page buffers in the page buffer supervising table 19 are changed.

When detecting the end of the reading from the set of page buffers corresponding to the page size, the printer memory controller 109 issues the page-buffer-readout-end interruption to the CPU. This interruption is not issued even when a page buffer for a page preceding the last page of the set of page buffers is read out.

Figure 6:
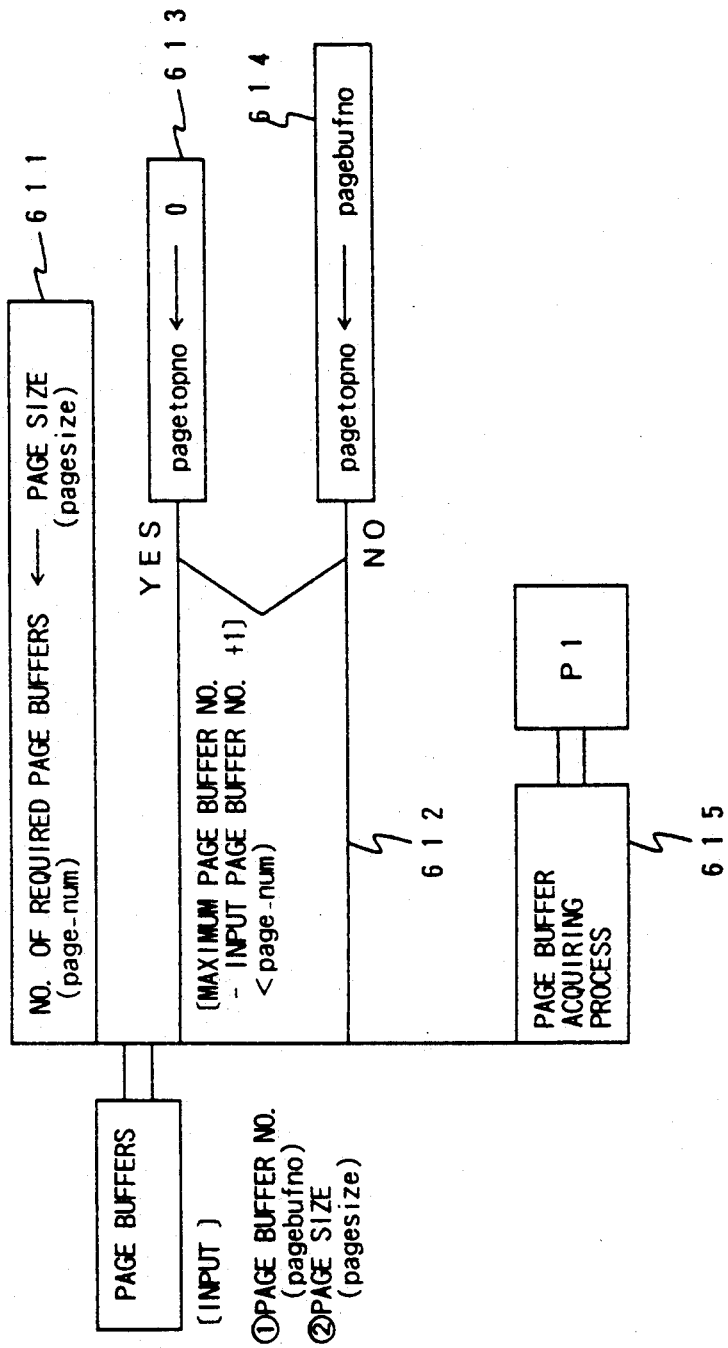
FIGS. 6(a1), 6(a2), and 6(b) are PAD drawings illustrating the procedure for processing the page buffer control macro to realize the variable length page buffer control system of the invention.
Figure 6:
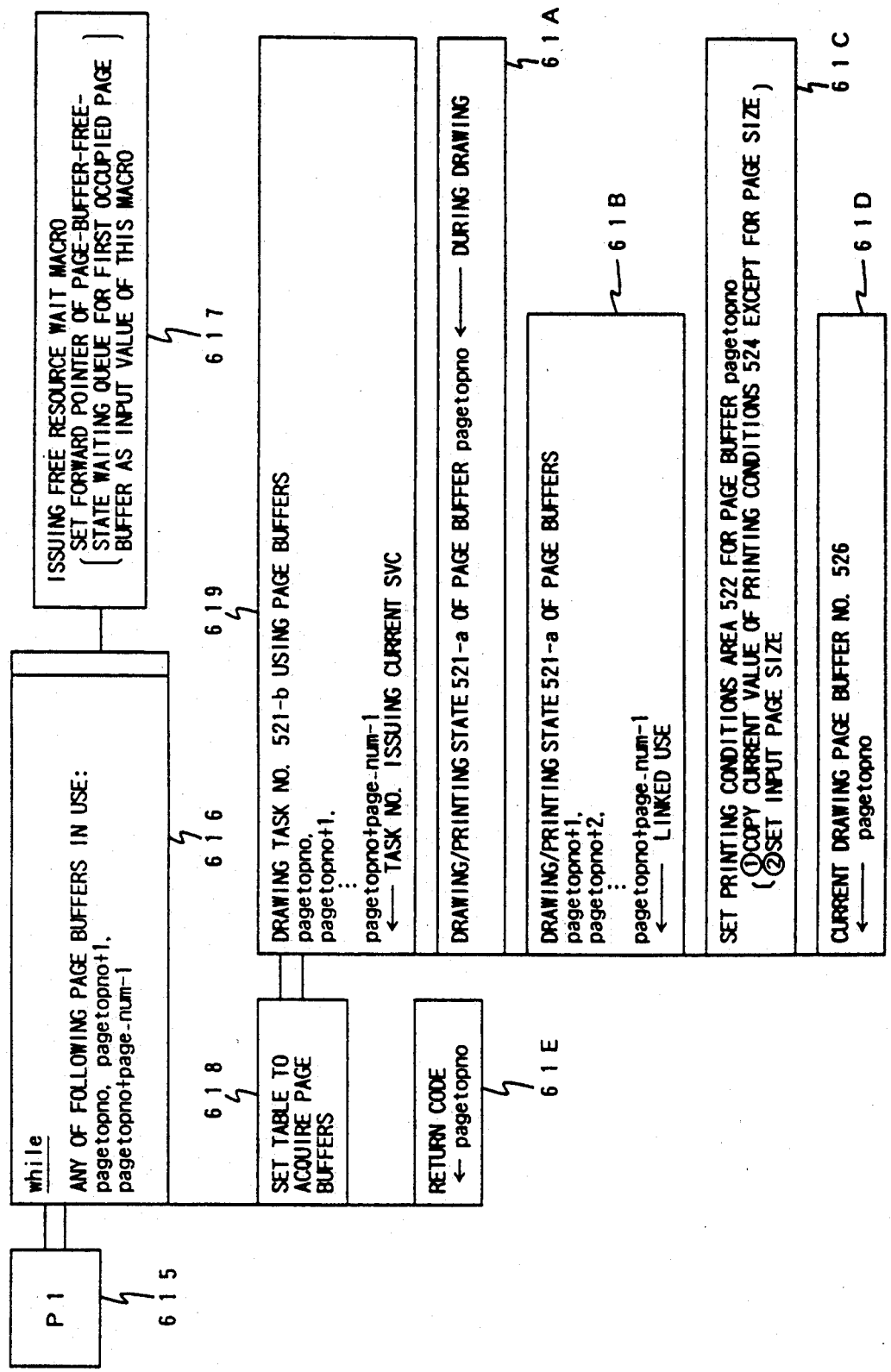

The procedure for carrying out the page buffer reserve process and the page buffer free process, which are the gist of this embodiment, is illustrated in PADs (Problem Analysis Diagrams) of FIGS. 6(a1), 6(a2), and 6(b).

The page buffer reserve process will be described referring to FIGS. 6(a1) and 6(a2). The page buffer reserve is operated with parameters of the inputted page buffer number (pagebufno) and page size (pagesize). The page buffer reserve first determines the number of page buffers (page-bum) required depending upon the page size (process 611). Next, 1 (one) is added to the difference between the largest number of the page buffer in the page buffer memory 14 and the input page buffer number (pagebufno). The number (page-num) of the necessary page buffers is deducted from the above value. Then the sign of the result is judged (process 612). If the sign is negative, the local variable 'pagetopno' is set to 0 (process 613). If the sign is not negative, the input page buffer number (pagebufno) is assigned to pagetopno (process 614). Next, the page buffer acquiring process 615 is carried out.

So long as any of the page buffer pagetopno, page buffer pagetopno+1, ..., page buffer pagetopno+page-num−1 is being used (process 616), the forward pointer of free-state-waiting queue for the first page buffer (hereinafter referred to as page buffer A) occupied, i.e., not free, is set to the input value, and then a free-resource-wait macro is issued (process 617). When the macro is executed, the task issuing the page reserve SVC is switched to the page buffer free wait state for the page buffer A.

When all the 'page-num' page buffers starting from the page buffer pagetopno become free through the process 616, these free buffers are reserved by the page-buffer-reserving-table-set process 618. The process 618 carries out processes 619 to 61D. In the process 619, the SVC issuing task number is written into the drawing task number 521-b for all the necessary number (page-num) of the page buffers pagetopno, pagetopno+1, ... pagetopno+page-num−1. In the process 61A, the drawing/printing state 521-a of the page buffer pagetopno is made "during printing" state. In the process 61B, the drawing/printing state 521-a of all the page buffers pagetopno+1, pagetopno+2, ..., pagetopno+page-num−1 is put into "linked use". In the process 61C, all the items except for the page size designating parameter in the current value 524 of printing conditions are copied and written into the printing conditions area 522 for the page buffer pagetopno. The page size (pagesize) is written into the item for the paper size designating parameter in the printing conditions area 522 for the page buffer pagetopno. In the process 61D, the pagetopno value is set in the current drawing page buffer No. 526. When the page buffer reserving-table-set process 618 is completed, the value of pagetopno is set in the return code (61E), thereby finishing the page buffer reserve process.

Figure 6B:
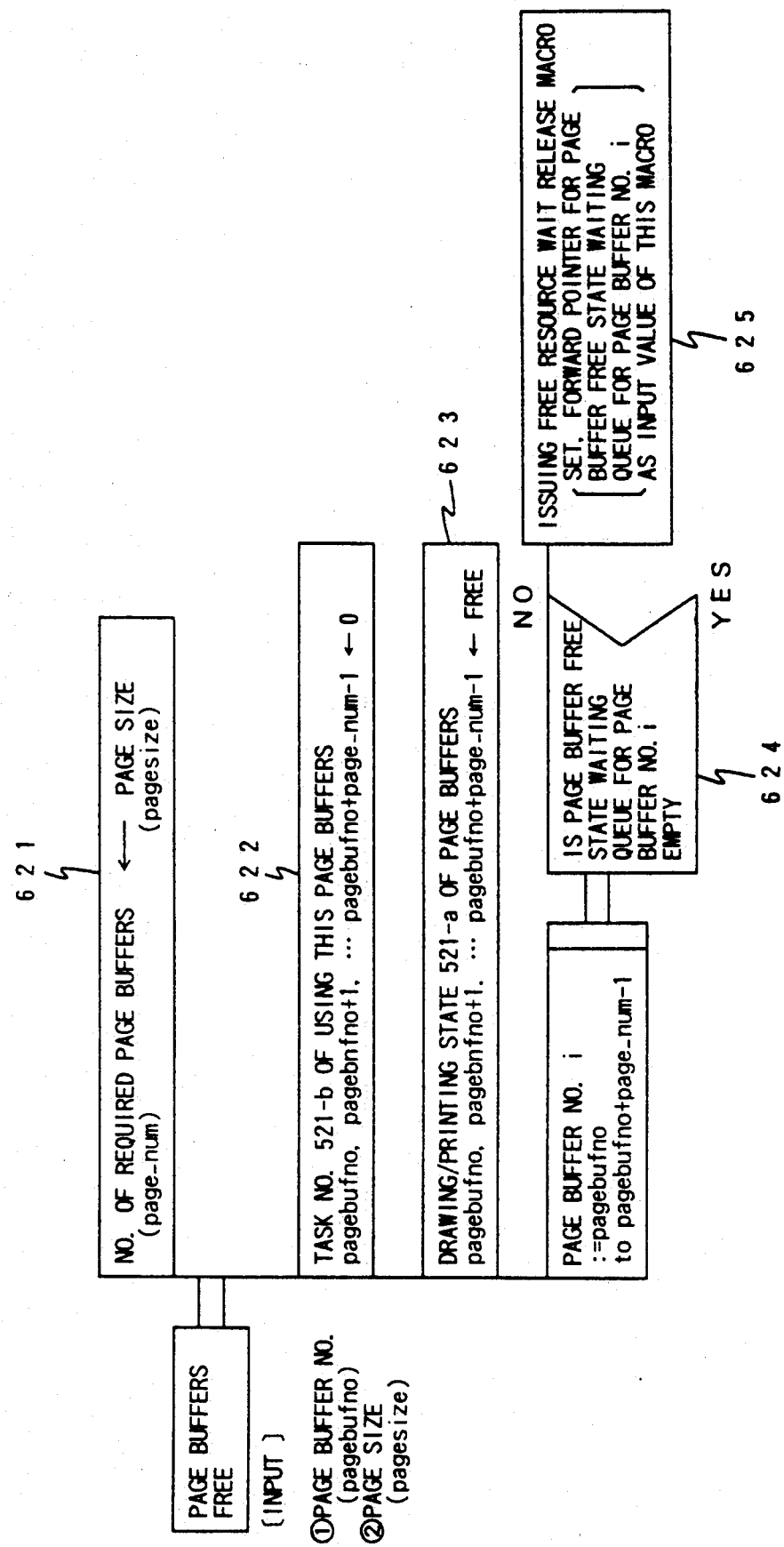

The page buffer free process will be described with reference to FIG. 6(b). This SVC process uses the page buffer number (pagebufno) and page size as inputs similarly to the page buffer reserve process. The page buffer free process first determines the number (page-num) of necessary page buffers according to the page size (process 621). Zero (0) is written into the draw task number 521-b for all the necessary number (page-num) of the page buffers including page buffers pagebufno, pagebufno+1, . . . , patebufno+page-num−1 (process 622). Zero (0) represents that none of the tasks is using the page buffers mentioned above. Following the process 622, the drawing/printing state 521-a of all the page buffers pagebufno, pagebufno+1, . . . pagebufno+page-num−1 are made free (process 623). Then the page-buffer-free-state-waiting queue for the page buffers from page-bufno to page-bufno+page-num=1 is checked for the emptines (process 624). When the page-buffer-free-state waiting queue for a certain page buffer is not empty and if there is a task waiting for this availability of the page buffer, the page buffer free process sets the forward pointer of the page-buffer-free-state-waiting queue foe this page biffer in the input value, and issues the free-resource-wait-release macro (process 625). The page buffer free process is thus completed.

A print control apparatus according to a second embodiment will be described hereinafter. In this embodiment, a default page size is used to perform the drawing and printing processes when no page size designating command is sent from the host computer in the first embodiment of this invention. Here, as the default page size, the initial value (usually A4 size) is used for printing a document page having the page serial number 1, while the page size of the preceding page is used for printing a page having the page serial number 2 and succeeding numbers, and is managed by the print control apparatus. The page serial number 1 corresponds to the first document page of each document, received from the host computer 10. The page serial number stands for the serial number of the document pages (1 to 65534). The page serial number within the range of 1 to 65534 is cyclically used.

Figure 7:
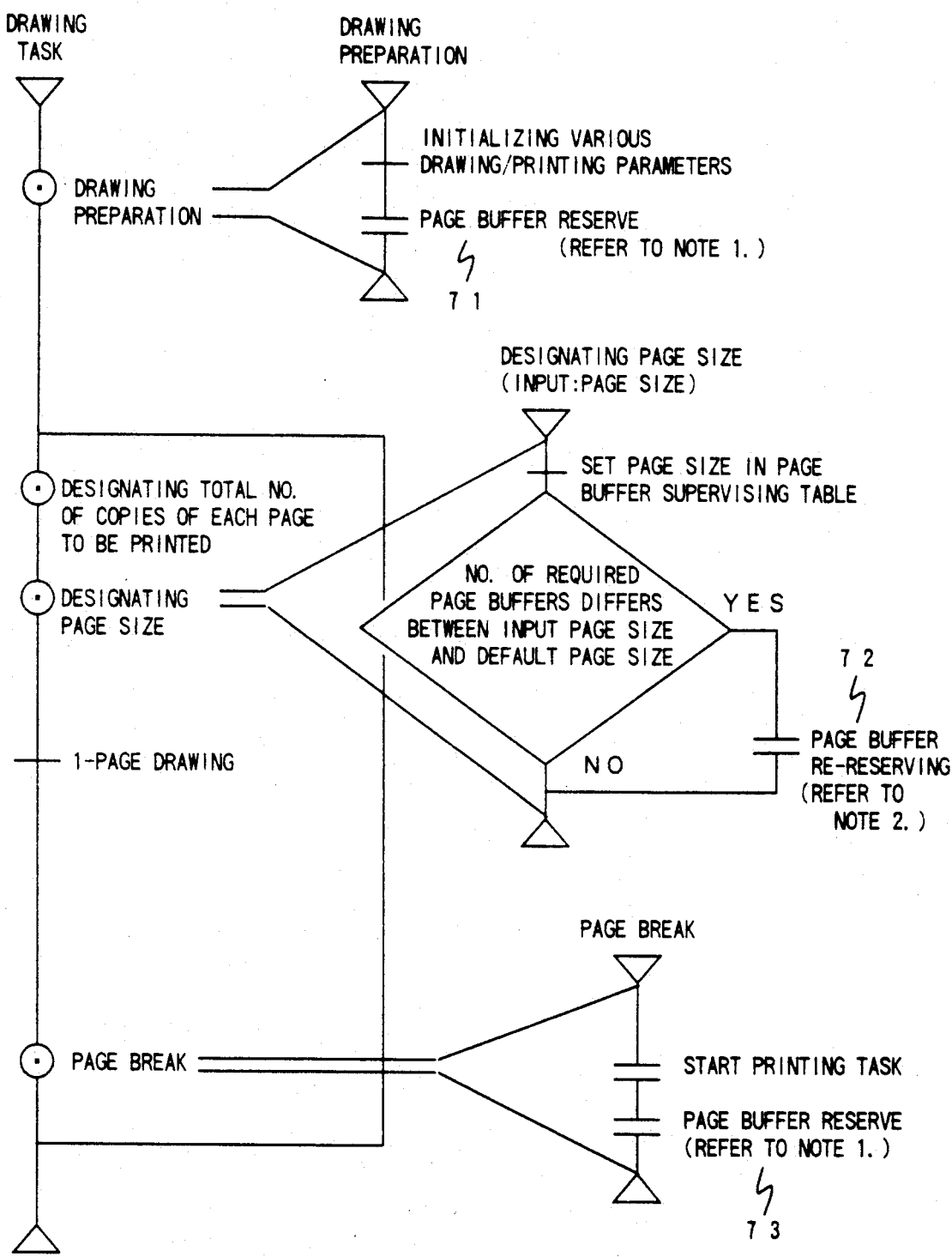
FIG. 7 is a view illustrating the method of reserving page buffers for a draw task.

To carry out the aforementioned functions, the draw task reserves the page buffers in the following two manners as illustrated in FIG. 7.

(i) Acquisition of page buffers for the default page size: The page buffer reserve SVC is issued using the default page size as an input argument in the following steps. When printing pages having the serial numbers 2 or more, the page buffer reserve process is executed in the step 73 for the page break process shown in FIG. 7. When printing the page having the serial number 1, the page buffer reserve process for the draw preparation process is carried out in the step 71 in FIG. 7.

(ii) Re-reservation of page buffers for the changed page size: Assume that the host computer 10 sends a page size designating command at the head of the document page after the total number of copies of each page designating command in order that a document having a certain serial page number is printed on a paper sheet whose page size differs from the default page size. In this case, the draw task carries out the page size designating process according to the page size designating command. In this process, the page size designating parameter is set to the related item of the printing conditions in the page-buffer-supervising table unit 18, and it is checked whether or not the designated page size and the default page size require a different number of page buffers.

If there is a difference in the number of page buffers, the page size designating process activates the SVC process (referred to as "page buffer re-reserve") in the page buffer control unit at the step 72 shown in FIG. 7 by using the changed page size and the current drawing page buffer No. 526 as input arguments. In the activated page buffer re-reserve process, page buffers for the changed page size are re-reserved by the processes (1) to (7) shown in the Function column in TABLE 1. Refer to FIGS. 6(c1) and 6(c2) for the page buffer re-reserve process.

The page buffer re-reserve process is executed by using the page buffer number (pagebufno) and the page size (pagesize) as inputs similarly to the page buffer reserve and page buffer free processes. For the page buffer re-reserve, the number of necessary page buffers (page-num) is first determined according to the page size. Next, 1 (one) is added to the difference between the largest page buffer number (in the page buffer unit 14) and the input page buffer number (pagebufno). Then, the number of necessary page buffers (page-num) is deducted from the above value, and the sign of the remainder is checked (process 632). If the sign is negative, the local variable pagetopno is made 0 (zero)(process 633). Otherwise, the input page buffer number (pagebufno) is substituted in the above pagetopno (process 634). Then, the reserved page buffers will be released by the process 635.

In the free process 635, the number of necessary buffers according to the default page size is determined by using the correspondence diagram or the like shown in FIG. 3(a), and is set in the local variable page-num 2 (process 636). Next, a judgment is made on the sign of the difference between the number of necessary page buffers (page-num) corresponding to the input page size and the number of necessary page buffers (page-num 2) corresponding to the default page size (process 637). If the sign is negative, the drawing/printing state 521-a is emptied for the page buffers pagetopno+page-num, pagetopno+page-num+1, . . . , pagetopno+page-num 2−1. In addition, the drawing task number 521-b for the above page buffers is made zero (process 638). In the process 638, when the task number which is using the page buffers before they are made empty is not equal to the task number issuing the page buffer re-reserve SVC, the abnormal value−1 is set in the SVC process return code, completing the SVC process. Following the process 638, the release process 635 sets the input page size (pagesize) as the page size for the page buffer pagebufno. To be more specific, the above input page size (pagesize) is set in the page size designating parameter in the printing conditions area 522 for the page buffer pagefuno (process 639).

When the sign is negative in the process 637, the page buffer re-reserve process is finished (processes 640, 647). Otherwise, the number of page buffers for the input page size and that of page buffers for the default page size is compared (process 641). When the former is larger than the latter (process 641), the drawing/printing state 521-a is made free for the page buffers pagebufno, pagebufno+1, ..., pagefuno+page-num 2−1, and the drawing task number 521-b for the above page buffers is made zero (process 642).

Following the process 642, the page buffer acquiring process 646 is carried out, thereby completing the page buffer re-reserving process. In the page-buffer-acquiring-process 646, the process, the same as the process 615 shown in FIG. 6(a), is performed.

In the process 642, the values in the printing conditions area 522 for the page buffer pagebufno are kept unchanged as mentioned in Note 1 shown in FIG. 6(c).

When the number of necessary page buffers corresponding to the input page size is judged to be equal or smaller than the number of necessary page buffer corresponding to the default page size in the process 641, the input page size and the default page size are compared for agreement (process 643). If they do not agree to each other, the input page size (pagesize) is set as the page size for the page buffer pagebufno. To be more specific, the value of the input page size (pagesize) is set in the page size designating parameter in the printing conditions area 522 for the page buffer pagebufno (process 644). Following the processes 643 and 644, the page buffer re-reserve process is completed (processes 645 and 647).

In the above embodiment, the page break process and the page size designating process are implemented as sub-routines while the page buffer reserve process and the page buffer re-reserve process are implemented as SVCs. It is also possible to implement the former two processes as SVCs and to implement the latter two processes as sub-routines in the former two processes. The point is that at the time of the draw preparation and page break, the page buffer reserve process for the default page size should be carried out as shown in FIG. 7, and at the time of designating the page size, the page buffer re-reserve process for changed page size should be carried out.

According to the present embodiment, by supporting a defaultd page size while realizing a variable length page buffer control which changes configuration of the page buffers in accordance with change of page size by a user, a command to designate the page size is allowed to be omitted, thereby improving usability of the print control apparatus.

A third embodiment of this invention will be described with reference to FIGS. 8(a) and 8(b).

Figure 8A:
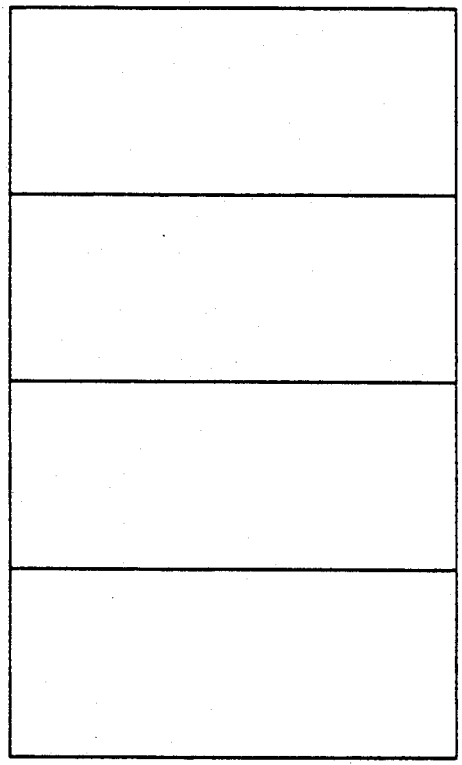
FIGS. 8(a) and 8(b) illustrate a third embodiment of the invention.
Figure 8B:
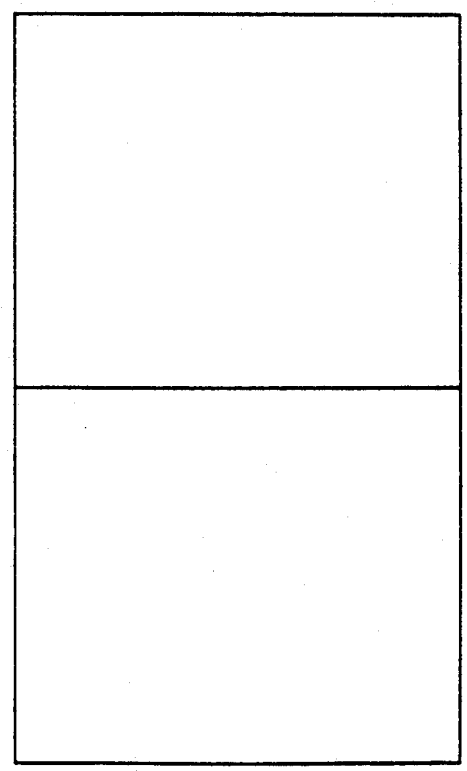

As illustrated in FIG. 8(a), once the page size (referred to as the first page size, A4 size for instance) is determined, one or more page buffers regions having the fixed length of capacity according to the page size are uniformly placed within the total page buffer capacity by using the page buffer controlling SVC function referred to as the page buffer arrangement. Then, the draw process and the print process are carried out. Unless change of the page size is instructed, both the draw process and the print process are continued while maintaining the page buffer arrangement described above.

Assume that it is instructed by the command sent from the host computer 10 or the key input operation from the user operation panel to change the first page size to a second page size (A3 size, for example).

When detecting the size change instruction, the draw task issues the task controlling function referred to as the event occurrence wait SVC, and puts itself to the event occurrence wait state until all the paper sheets having the first page size are printed and outputted. When all the paper sheets for the first page size are outputted and the event occurrence wait state is released, the draw task issues the page buffer arrangement SVC so as to uniformly place one or more page buffers of a certain page size according to the second page size as illustrated in FIG. 8(b). Then the draw task continues the processing for the second page size until the page size is changed.

In this embodiment, unless the page size is changed, the drawing and the printing are carried out by means of the fixed length page buffer controlling system similarly the system disclosed in the above-cited Japanese patent application No. 164637/1989. The macro functions for the page buffer reserve and the page buffer free, and the specification of the page buffer supervising table unit are the same as those disclosed in the foregoing Japanese application.

In the above embodiments, each time the page size is changed, the page buffer arrangement SVC is frequently issued to relocate the page buffers to cope with the changed page size. To decrease frequent relocations of the page buffers and frequency of the sheet output end waiting, it is feasible to employ the fixed length page buffer arrangement for the B4 size for the page sizes smaller than the B4 size and to employ the fixed length page buffer arrangement for the A3 size for the page sizes larger than B4. In this case, the processing is carried out as mentioned above.

In this embodiment, printing of large paper sheets can be carried out in a simple method compared with those in the first and second embodiments of this invention although the printing of large paper sheets has been very difficult in the conventional printing apparatuses. However this embodiment is somewhat inconvenient since the throughout is decreased due to the period of time for waiting for the completion of the sheet outputting.

A fourth embodiment of this invention will be described hereinafter. In this embodiment, it is assumed that the dot density of the printer engine unit is changeable. The dot density is changed by the command sent from the print control apparatus to the printer engine unit, or the user's operation for the printer engine setting. The dot density of the printer engine is changed as follows: (i) The dot density is changeable for each document page while the print control apparatus and the host computers are on line, and the printer engine unit is kept powered on. (ii) The dot density is changeable after the host computer and the print control apparatus are off line temporarily. (iii) The dot density is changeable after the printer engine unit is turned off.

When the print control apparatus can instruct the printer engine unit 16 to change the dot density by sending the dot density changing command or other means, the user can send the dot density changing command to the print control apparatus from the host computer 10, or by operating input keys on the user operation panel. When it is instructed to change the dot density, the print control apparatus sends the command to the printer engine unit 16 to instruct the change, and modifies the page buffer placement as described below.

(1) When the variable length page buffer control system is used as in the first and second embodiments:

(i) The dot density is added to the input argument of the respective page buffer control SVCs shown in TABLE 1.

(ii) For the respective page buffer control SVCs, the method for determining the necessary page buffers shown in FIG. 3(a) is expanded so as to determine the number of necessary page buffers by inputting the page size and the dot density.

(iii) One unit page comprises a buffer of a capacity for a small size paper sheet having a low dot density. For example, an A5 size sheet of 240 dots per inch or 150 dots per inch is assumed to be one unit page.

(2) When the fixed length page buffer arrangement system is employed as in the third embodiment:

The dot density is added to the input arguments of the page buffer arrangement SVC shown in TABLE 7. This SVC places the page buffers of a certain size uniformly within the total capacity of the page buffers based on the page size and the change of the dot density.

To be more specific, the parameters related to the page buffer size (of a unit page buffer), the total number N of regions of the page buffers and the leading address of the page buffers and so on, on the page buffer supervising table unit 18 for performing the fixed length page buffer control, are renewed according to the changed page size or dot density.

According to the fourth embodiment, both drawing and printing can be carried out even when not only the page size of the document but also the dot density are changed, thereby improving the usability of the printer composed of the print control apparatus and the printer engine unit.

The foregoing embodiments of this invention are also applicable in the following cases.

(1) Tasks other than those shown in TABLE 5 are added to the tasks of the task processing unit 13.

(2) The host computer 10 sends the train of commands to the print control apparatus by the methods mentioned below:

(a) One draw command and one print command are sent for each page.

(b) 0 or 1 or more draw command series and one print command are sent for each page.

(c) In addition to (a) and (b), control data on each page (i.e., page size, vertical/horizontal writing, total number of copies of each page to be printed, single-sided/double-sided print) are sent as one of the draw commands, or separate commands other than the draw command and print command.

The draw command is for instructing the contents to be drawn to the page buffers, and the print command is for instructing the end of drawing on the page buffers and the activation of the print task for the page buffers where the drawing is completed.

(3) The tasks are defined in correspondence with the respective commands from the host computer, or in correspondence with the whole train of commands composing one page.

TABLE 1

| SVC | INPUT | OUTPUT | FUNCTIONS | REMARKS |
|---|---|---|---|---|
| Page buffer reserve | ① Page buffer No.<br>② Page size | Return code<br>0 or more :<br>Leading page buffer No. reserved<br>−1 : abnormal | ① Determine the number of necessary page buffers corresponding to the input page size.<br>② Reset the input page buffer No. to "0" when (largest page buffer no. − input page buffer no. + 1) < No. of necessary page buffers.<br>③ If necessary number of page buffers are all free according to the input page buffer no. as the origin, the task No. issuing SVC is registered as a resource user of these page buffers.<br>④ Renew the current drawing page buffer no. in page buffer supervising table to the input page buffer no. as the origin when the page buffers are reserved.<br>⑤ Issue the resource free wait macro, when there are one or more page buffers already occupied of all the necessary page buffers and put the SVC issuing task in the page buffer free wait state for the first occupied page buffer. | |
| page buffer free | ① Page buffer No.<br>② Page size | Return code<br>0 : normal<br>1 : abnormal | ① Determine the number of necessary page buffers corresponding to the input page size.<br>② The necessary number of page buffers based on the input page buffer no. are all set free. That is, each resource user of these page buffers are set empty.<br>③ Issue the free resource wait release macro when the page buffer free-state-waiting queue for any of necessary page buffers is not empty. | |
| Page buffer re-reserve | ① Page buffer No.<br>② Page size | Return code<br>0 or more :<br>No. of the leading page buffer reserved<br>−1 : abnormal | ① Determine the number of necessary page buffers corresponding to the input page size.<br>② Renew the input page buffer No. to "0" when (largest page buffer no. − input page buffer no. + 1) < the number of necessary page buffers.<br>③ Following issuance of the page buffer reserve SVC, if the number of reserved page buffers differs from the number of page buffers required for the current SVC, the page buffers, reserved according to the page buffer reserve SVC, are set free.<br>④ If the task no. issuing the SVC differs from the task no. which issued the page buffer reserve and is using page buffers, the return code "−1" is returned and the processing is completed.<br>⑤ If necessary number of page buffers are all free with the input page buffer no. as the origin, the task No. issuing current SVC | To be used to re-reserve page buffers when the page size is changed after issuance of the page buffer reserve. |

TABLE 1-continued

| SVC | INPUT | OUTPUT | FUNCTIONS | REMARKS |
|-----|-------|--------|-----------|---------|
| | | | is registered as a resource user of these page buffers.<br>⑥ Renew the current drawing page buffer no. to the input page buffer no. as the orignin when the page buffers are reserved.<br>⑦ Issue the free resource waiting macro, when there are one or some page buffers already occupied of all the necessary page buffers, and put the SVC issuing task in the page-buffer-free-wait-state for the first occupied page buffer. | |

TABLE 2

| INTERRUPT ISSUER | INTERRUPT FACTORS AND PROCESSES |
|------------------|--------------------------------|
| Printer memory controller | ① Page-buffer-readout-end interrupt process |

TABLE 4

| INTERRUPT ISSUER | INTERRUPT FACTORS AND PROCESSES |
|------------------|--------------------------------|
| Sub-CPU | ① Printing-instruction-allowance interrupt process<br>② Page-buffer-readout-start interrupt process<br>③ Printer-status-reception-demand interrupt process<br>④ Printer-error-reception-demand interrupt process<br>⑤ Panel-key-input interrupt process |
| Timer hardware | ① Sheet-output-end timer interrupt process |

TABLE 3

| SVC | INPUT | OUTPUT | FUNCTIONS |
|---|---|---|---|
| Ready condition confirmation | None | Printer state<br>0 : Normal<br>1 : Power off<br>2 : Warming up<br>3 : Test printing<br>4 : Abnormal | Check of both power-on and ready condition is performed via the sub-CPU. |
| Printing instruction | The pointer to the structure data about read start position of the printer memory controller | Return code<br>0 : Normal<br>1 : Abnormal | The six parameters of the given read start position (leading address of page, left margin dot number, right skip long word number, top margin dot number, page size breadth long word number, page size right dot number) are set into the registers of the printer memory controller, and printing instruction is issued to printer engine unit via the sub-CPU. By using the event occurrence wait macro of the task control, the SVC issuing task in question is moved to the print-instruction-allowance wait state. |
| Sheet feed unit check | None | The pointer to the structure type data about sheet feed/output unit condition table | ① Check of the sheet feed unit condition is instructed via the sub-CPU.<br>② Check result is set to the substructure type data about sheet feed/output unit condition table 624. |
| Sheet feed unit instruction | ① Paper size code<br>② Feed unit code<br>③ Paper horizontal / vertical code<br>  0 : Horizontal<br>  0 : Vertical | Return code<br>0 : Normal<br>1 : Abnormal | ① After a parameter check is made on the given paper size code, feed unit code, and paper horizontal/vertical code, compare these input values and the values in sheet feed/output unit condition table (feed unit code etc. above mentioned). If there is cassette having the input page size in the sheet feed unit corresponding to the input sheet feed unit code, and sheet feed feasible condition is satisfied, sheet feeding is instructed to printer engine unit via the sub-CPU.<br>② If no cassette is set on the printer engine unit, or feed unit is not designated, the sheet feed unit is determined based on the paper size designated, the sheet feed unit is determined based on the paper size and instructed.<br>③ If the sheet feed feasible condition is not satisfied, the abnormal code is returned. |
| Printer reserve | None | None | ① If the printer is free (when the printing instruction allowance flag in the printer supervising table unit becomes "ready"), the printer is reserved, and returned to the SVC issuer. In the reservation, the task No. issuing this SVC is registered in the printer supervising table unit as the user of the printer and also the printing instruction allowance flag is set to "not ready".<br>② If the printer is not free, task issuing SVC in question is set to the the printer free wait state by using resource empty waiting macro. |
| Printer free | None | None | The printer is released.<br>The printing instruction allowance flag on the printer supervising table unit is set to "ready", and the print task number for using the printer on the printer supervising table is set to be empty. If the printer free waiting task is present, all the tasks in the printer free wait waiting queue is released from the printer free wait state by using the free resource wait release macro. |
| Error code check | None | Error code<br>−1 : Normal<br>Other than −1 : Abnormal | ① Ready condition of the printer is checked, and then "−1" is returned as the error code if the printer is in ready condition.<br>② If the printer is not in ready condition, the error factor in the printer engine is investigated and the error code corresponding to |

TABLE 3-continued

| SVC | INPUT | OUTPUT | FUNCTIONS |
|---|---|---|---|
| | | : Abnormal | the error factor is returned.<br>③ If two or more errors simultaneously occur, the error code having the highest priority is returned. |
| Printer initialization | None | None | ① Negation of the print signal(PRINT) is instructed via sub-CPU.<br>② The printer memory controller is reset. |
| Sheet output unit code | | The pointer to the structure type data about sheet feed/output unit condition table | ① Check of the sheet output unit condition is instructed by the sub-CPU.<br>② Check result is set to the structure type data about sheet feed/output unit condition table 624. |
| Sheet output unit instruction | Sheet output unit code | Return code<br>0 : Normal<br>1 : Abnormal<br>1 : Abnormal | ① Check is made to the sheet output unit code and the values in sheet output unit condition table, and sheet outputting is instructed via the sub-CPU if sheet output unit corresponding to the input sheet output unit code is present and sheet output feasible condition is satisfied.<br>② If the sheet output unit is not present, or present but the sheet output feasible condition is not satisfied, the abnormal code is returned. |

TABLE 5

| TASK No. | TASK TITLE | SYSTEM TASK/ USER TASK | PRIORITY | FUNCTIONS |
|---|---|---|---|---|
| 1 | Idle task | System task | 3 | Process during idle time |
| 2 | Mode sense task | System task | 0 | Task for executing mode snese command |
| 3 | Suspend task | User task | 0 | Task for suspending the printer control apparatus |
| 4 | (Not used) | — | — | — |
| 5 | Cancel task | System task | 0 | Task for executing cancel command |
| 6 | Draw task | User task | 2 | Task for executing print command and drawing on page buffer memory |
| 7 | Print task 1 | | | |
| 8 | Print task 2 | | | |
| 9 | Print task 3 | | | |
| 10 | Print task 4 | | | |
| 11 | Print task 5 | User task | 1 | Task for performing printing for page buffers on which drawing is completed |
| 12 | Print task 6 | | | |
| 13 | Print task 7 | | | |
| 14 | Print task 8 | | | |
| 15 | Print task 9 | | | |
| 16 | Print task 10 | | | |

TABLE 6

| SVC | INPUT | OUTPUT | FUNCTIONS |
|---|---|---|---|
| Page break | None | None | ① Drawing on the current drawing page buffer no. 526 is completed for a certain document page.<br>② The print task no. to be used next is renewed and determined.<br>③ The current drawing page buffer no. 526 is written on the area for the print task no. determined in ② in the print task using page buffer data 529.<br>④ The current drawing page buffer no. 526 is set in the current printing page buffer no. 527.<br>⑤ The print task having the task no. determined in ② is activated.<br>⑥ The current drawing page buffer no. 526 is renewed. The no. 526 is renewed by the necessary page buffer numbers corresponding to the page size to which drawing is completed.<br>⑦ The number of page buffers required by the default page size starting from the current drawing page buffer no.526 (function similar to the page buffer reserve macro shown in TABLE 1 are executed). |
| Page size change | Page size | Return code<br>0 : Normal<br>1 : Abnormal | ① The input page size is set in the page size designating parameter area for the current drawing page buffer no. 526 in the page buffer superevising table.<br>② If the input page size and the default page size require different number of page buffers, re-reserve necessary number of page buffers corresponding to the page size starting from the current drawing page buffer no. 526 (function similar to page buffer re-reserve macro shown in TABLE 1 is executed). |

TABLE 7

| SVC | INPUT | OUTPUT | FUNCTIONS |
|---|---|---|---|
| Page buffer arrangement | Page size | Return code<br>0 : Normal<br>1 : Abnormal | ① According to the input page size, the page buffer size (of single page buffer), total number N of page buffers, and leading address of each page buffer are determined and set in the area for data 51 common to all the page buffers in the page buffer supervising table unit 18.<br>② '1' is returned as the return code if the input page size is not supported by the print control apparatus or the printer engine unit, or when no page buffer is reserved in the page buffer region for the input page size. Otherwise, '0' is returned as the return code. |

What is claimed is:

1. A print control apparatus for controlling a printing operation for printing a page having a page size selected from a plurality of different page sizes, comprising:
 a plurality of same-sized page buffers each having a size equal to one of (1) a smallest page size of the different page sizes and (2) a page size of the different page sizes larger than a smallest page size of the different page sizes and smaller than a largest page size of the different page sizes;
 registering means for registering a number of the page buffers required to at least equal a size each of the different page sizes; and
 reserving means for obtaining the number of the page buffers required to at least equal the size of the selected page size from the registering means and reserving the obtained number of the page buffers such that the reserved page buffers can be used as if they were a single page buffer having a size at least equal to the selected page size.

2. A print control apparatus according to claim 1, further comprising means for printing the page using the reserved page buffers.

3. A print control apparatus according to claim 1, wherein the reserving means includes:
 means for receiving a command for changing the selected page size; and
 means for successively reserving a same number of the page buffers for successive pages until the receiving means receives a command for changing the selected page size.

4. A print control apparatus according to claim 1, further comprising means for changing the size of the page buffers, wherein the registering means includes means for registering a number of the page buffers of a changed size required to at least equal each of the different page sizes one of (1) together with a number of page buffers of an unchanged size required to at least equal each of the different page sizes and (2) in place of a number of page buffers of an unchanged size required to at least equal each of the different page sizes.

5. A print control apparatus for controlling a printing operation, comprising:
 a command buffer for storing a train of commands including a drawing command and a printing command;
 task processing means receiving the train of commands from the command buffer for executing a drawing task to produce image data for a page having a page size selected from a plurality of different page sizes in response to the drawing command, and for executing a printing task to print the image data produced by the drawing task on a page having the selected page size with a printer engine in response to the printing command;
 a plurality of same-sized page buffers for storing the image data produced by the drawing task;
 page buffer supervising table means for storing page buffer supervising information;
 printer supervising table means for storing printer supervising information;
 page buffer control means for reserving a number of free ones of the page buffers required to at least equal the selected page size with reference to the page buffer supervising information stored in the page buffer supervising table means for storing the image data produced by the drawing task in response to a request from the drawing task, and for reserving occupied ones of the page buffers in which the image data produced by the drawing task has been stored and a free printer engine with reference to the page buffer supervising information stored in the page buffer supervising table means and the printer supervising information stored in the printer supervising table means in response to a request from the printing task; and
 printer control means for reading out the image data produced by the drawing task from the occupied page buffers and supplying the read out image data to the free printer engine in response to a request from the printing task, and for instructing the page buffer control means to free the occupied page buffers after the image data produced by the drawing task has been read out from the occupied page buffers.

6. A print control apparatus for controlling a printing operation for printing a page having a page size selected from a plurality of different page sizes at a dot density selected from a plurality of different dot densities, comprising:
 a plurality of same-sized page buffers each having a size equal to one of (1) a smallest page size of the different page sizes and (2) a page size of the different page sizes larger than a smallest page size of the different page sizes and smaller than a largest page size of the different page sizes at a dot density of the different dot densities lower than a highest dot density of the different dot densities;
 registering means for registering a number of the page buffers required to at least equal a size each of the different page sizes at each of the different dot densities; and
 reserving means for obtaining the number of the page buffers required to at least equal the size of the selected page size at the selected dot density from the registering means and reserving the obtained number of the page buffers such that the reserved page buffers can be used as if they were a single page buffer having a size at least equal to the selected page size at the selected dot density.

7. A print control apparatus according to claim 6, further comprising means for printing the page using the reserved page buffers.

8. A print control apparatus according to claim 6, further comprising means for changing the size of the page buffers in accordance with the selected dot density.

* * * * *